United States Patent [19]

Voit et al.

[11] Patent Number: 5,751,707

[45] Date of Patent: May 12, 1998

[54] AIN INTERACTION THROUGH WIRELESS DIGITAL VIDEO NETWORK

[75] Inventors: Eric A. Voit, Silver Spring; Bruce Kostreski, Wheaton; Lance Liptak, Laytonsville, all of Md.; Kenneth DePaul, Wake Forest, N.C.

[73] Assignee: Bell Atlantic Network Services, Inc., Arlington, Va.

[21] Appl. No.: 564,999

[22] Filed: Nov. 30, 1995

Related U.S. Application Data

[63] Continuation-in-part of Ser. No. 563,400, Nov. 30, 1995, which is a continuation-in-part of Ser. No. 491,515, Jun. 19, 1995, Pat. No. 5,729,549.

[51] Int. Cl.$^6$ .................................. H04J 3/12; H04N 7/025
[52] U.S. Cl. .................... 370/384; 370/522; 379/93.23
[58] Field of Search .................................. 370/486, 496, 370/522, 535, 536, 537, 357, 384, 401; 455/3.1, 4.1, 4.2, 3.2, 6.3; 348/6–13; 379/230, 96, 88, 127, 112, 142, 207, 93.1, 93.23; 375/222

[56] References Cited

U.S. PATENT DOCUMENTS

| | | |
|---|---|---|
| 2,629,816 | 2/1953 | Rabuteau . |
| 3,836,726 | 9/1974 | Wells et al. . |
| 4,255,814 | 3/1981 | Osborn . |
| 4,718,109 | 1/1988 | Breeden et al. . |
| 4,750,036 | 6/1988 | Martinez . |
| 4,752,954 | 6/1988 | Masuko . |
| 4,763,191 | 8/1988 | Gordon et al. . |
| 4,916,532 | 4/1990 | Streck et al. . |
| 4,939,726 | 7/1990 | Flammer et al. . |
| 5,007,052 | 4/1991 | Flammer . |
| 5,038,403 | 8/1991 | Leitch . |
| 5,079,768 | 1/1992 | Flammer . |
| 5,083,403 | 1/1992 | Otterbein, II . |
| 5,101,499 | 3/1992 | Streck et al. . |

(List continued on next page.)

OTHER PUBLICATIONS

"MMDS (Wireless Cable): An Alternative Delivery Medium for Digital Terrestrial Television," J. Caffrey, CMiS Ltd., Ireland, pp. 611–619, 1994.

"FM Wireless TV to Bite the Apple," by Peter Lambert, Broadcasting Technology, Dec. 21, 1992, pp. 46–47.

"The Ricochet Network", authored by Metricom.

Berman et al, "Perspectives on the AIN Architecture", IEEE Communications Magazine, Feb. 1992, pp. 27–32.

"The Space system: A new dimension in service creation", Bellcore Exchange, Jan./Feb. 1992, pp. 8–13.

"Turning concepts into reality with the Space system", Bellcore Exchange, May/Jun. 1992, pp. 25–28.

*Primary Examiner*—Chau Nguyen
*Attorney, Agent, or Firm*—Lowe, Price, LeBlanc & Becker

[57] ABSTRACT

A control node, such as a services control point, of an intelligent telephone network interfaces to a wireless broadband network for signaling communications with broadband terminals. In normal operation, the terminals present video or other broadband information carried on the wireless network, typically via an associated television set. During processing of a telephone call, a central office switching system of the telephone network will recognize a predetermined event in call processing which triggers a query to the control node. Ultimately, the control node will return an instruction to the switching system to continue call processing. However, as part of its own processing, the control node sends a message through the broadband network to the broadband terminal of the subscriber to which the telephone call relates. If operational, the terminal may display call related information contained in the message, e.g. Caller ID information for an incoming call. The display may also prompt the user to input information. If so, the set-top terminal will transmit the subscriber input information upstream through the wireless broadband network to the control node. In such a case, the control node formulates its instruction to the central office switching system to control further processing of the telephone call, at least in part, based on the subscriber input information. The call processing of the present invention applies to both incoming and outgoing calls.

40 Claims, 11 Drawing Sheets

U.S. PATENT DOCUMENTS

| | | | |
|---|---|---|---|
| 5,115,433 | 5/1992 | Baran et al. . | |
| 5,117,503 | 5/1992 | Olson . | |
| 5,127,101 | 6/1992 | Rose, Jr. . | |
| 5,128,925 | 7/1992 | Dornstetter et al. . | |
| 5,130,987 | 7/1992 | Flammer . | |
| 5,177,604 | 1/1993 | Martinez . | |
| 5,230,086 | 7/1993 | Saul . | |
| 5,231,494 | 7/1993 | Wachob . | |
| 5,239,671 | 8/1993 | Lindquist et al. . | |
| 5,239,672 | 8/1993 | Kurby et al. . | |
| 5,243,598 | 9/1993 | Lee . | |
| 5,247,347 | 9/1993 | Litteral et al. . | |
| 5,247,571 | 9/1993 | Kay et al. . | |
| 5,268,933 | 12/1993 | Averbuch . | |
| 5,274,666 | 12/1993 | Dowdell et al. . | |
| 5,278,889 | 1/1994 | Papanicoulaou et al. . | |
| 5,321,514 | 6/1994 | Martinez . | |
| 5,325,419 | 6/1994 | Connolly et al. | 379/60 |
| 5,327,486 | 7/1994 | Wolff . | |
| 5,343,239 | 8/1994 | Lappington et al. . | |
| 5,355,529 | 10/1994 | Lindquist et al. . | |
| 5,394,559 | 2/1995 | Hemmie et al. . | |
| 5,396,546 | 3/1995 | Remillard . | |
| 5,400,338 | 3/1995 | Flammer, III . | |
| 5,404,393 | 4/1995 | Remillard . | |
| 5,404,575 | 4/1995 | Lehto . | |
| 5,418,559 | 5/1995 | Blahut . | |
| 5,437,052 | 7/1995 | Hemmie et al. . | |
| 5,526,034 | 6/1996 | Hoarty et al. | 348/7 |
| 5,566,231 | 10/1996 | Sizer, II | 379/127 |
| 5,566,232 | 10/1996 | Sizer, II | 379/127 |
| 5,583,914 | 12/1996 | Chang et al. | 379/230 |
| 5,583,920 | 12/1996 | Wheeler, Jr. | 379/96 |
| 5,586,177 | 12/1996 | Farris et al. | 379/230 |
| 5,594,789 | 1/1997 | Seazholtz et al. | 379/96 |

Figure 8 SET-TOP TERMINAL -100-

AIN INTERACTION THROUGH WIRELESS DIGITAL VIDEO NETWORK

CROSS-REFERENCE TO RELATED APPLICATION

This application is a continuation in part of U.S. patent application Ser. No. 08/563,400 filed Nov. 30, 1995 entitled "ISCP VIDEO"; which is a continuation in part of U.S. patent application Ser. No. 08/491,515 filed Jun. 19, 1995 now U.S. Pat. No. 5,729,549 entitled "SIMULCASTING DIGITAL PROGRAMS FOR BROADCAST AND INTERACTIVE SERVICES", the disclosures of which are incorporated herein entirely by reference.

TECHNICAL FIELD

This invention relates generally to the processing of narrowband and broadband communications in an advanced intelligent network (AIN). In particular, the present is invention relates to the use of an integrated services control point (ISCP) to coordinate processing of at least certain narrowband calls via interactions through a wireless broadband network.

BACKGROUND ART

In recent years, a number of new service features have been provided by an enhanced telephone network, sometimes referred to as an Advanced Intelligent Network (AIN). For example, commonly assigned U.S. Pat. No. 5,247,571 to Kay et al. discloses an AIN type network providing a Centrex type service over a wide area.

In an AIN type system, local and/or toll offices of the public telephone network detect one of a number of call processing events identified as AIN "triggers". For ordinary telephone service calls, there would be no event to trigger AIN processing; and the local and toll office switches would function normally and process such calls without referring to the central database for instructions. An office which detects a trigger will suspend call processing, compile a call data message and forward that message via a common channel interoffice signalling (CCIS) link to an Integrated Service Control Point (ISCP) which includes a Multi-Services Application Platform (MSAP) database.

The ISCP is essentially a central control for the network. If needed, it can instruct the central office to obtain and forward additional information. Alternatively, the ISCP can access a separate database. Once sufficient information about the call has reached the ISCP, the ISCP accesses its stored data tables in the MSAP database to translate the received message data into a call control message and returns the call control message to the office of the network via CCIS link. The network offices then use the call control message to complete the particular call.

AIN networks were developed to meet the functional needs associated with the provision of voiceband telephone type telecommunications services. Modern telephone networks also provide a service commonly referred to as 'Caller ID'. With this service, the end office switch applies a frequency shift keyed data signal to a called party's telephone line during the silent interval between ringing pulses. The data signal includes at least a telephone number for the calling station and may include a name of a subscriber associated with the calling telephone station. A terminal at the called customer premises demodulates frequency shift keyed data signal and displays the number and/or data regarding the caller. AIN services and other telephone network services such as Caller ID have been limited to interactions through the narrowband telephone network.

Concomitant with the recent developments in advanced intelligent networks, several different wideband distribution networks have been proposed for offering subscribers an array of video services, including true Video On Demand service. For example, U.S. Pat. No. 5,247,347 to Litteral et al. discusses a digital video distribution network providing subscribers with access to multiple service providers through the public switched telephone network. Other developments relate to a wireless broadband network, sometimes colloquially referred to as 'Wireless Cable' because it provides services analogous to those offered by a cable television system. For example, U.S. Pat. Nos. 5,437,052 and 5,394,559 to Hemmie et al. disclose a wireless cable system using a bidirectional converter using a single microwave antenna to receive microwave programming signals at a first set of frequencies and transmit data at upstream signals at a second set of frequencies.

Although the combined advances in intelligent telephone network and digital broadband network have resulted in very effective telecommunications systems, the advances in the two types of network have been made somewhat independently and not always with a view as to how the operations of each might be coordinated and integrated with the other for even more effective communications. Known telephone call processing networks at most make very limited use of the additional broadband capabilities of modern customer premises equipment.

For example, U.S. Pat. No. 4,763,191 to Gordon et al. discusses a method for providing a nationwide dial-a-view service in which a caller desiring a given viewing selection dials an INWATS "1800" dial-a-view number for ordering that selection through the telephone network. A central data base system provides the originating toll office with routing instructions for sending the request to network services equipment. The network services equipment acknowledges the caller's request for cable services and processes the dial-a-view request. The network services equipment provides relevant data to cable television distribution equipment to control actual supply of requested programming to the calling subscriber. Separate vendor equipment supplies the requested, programming to the calling customer via activation of an addressable decoder at the calling customer's television. The broadband network components do not provide the user any information regarding narrowband calls, such as Caller ID, and do not permit any control over telephone call processing. Also, the broadband network is a landline type network.

As another example, U.S. Pat. No. 5,278,889 to Papanicolaou et al. and U.S. Pat. No. 5,329,308 to Binns et al. discuss a two-way video telephone system using a combination of a two-way cable television distribution system and an intelligent voice telephone network. The video distribution networks used are existing frequency division multiplexed analog transmission systems. As part of the disclosed call processing, a central database responds to video telephone call dialing information by providing instructions to the network to route the video portion of the call through a digital inter-exchange carrier network between points of presence of two of the cable television distribution networks. Signaling information sent through the broadband network to the customer premises equipment may include Caller ID. The disclosed system, however, does not integrate AIN processing through the broadband network on narrowband only telephone calls, there is no direct signaling between the high level control elements of the telephone network and the broadband terminals, and the broadband network is a landline type network.

From the above discussion, it becomes apparent that a need exists for better coordination between the AIN telephone network operations and operations through the broadband network. For any particular service, operations in support of the telecommunications exchanged should be carried out in a more seamless and integrated fashion. More specifically, there is a need for techniques that will allow the ISCP to communicate with a subscriber's broadband terminal device, regarding processing of at least certain narrowband calls. A further need exists to provide the necessary seamless communications services through a wireless type broadband network.

DISCLOSURE OF THE INVENTION

It is an object of the present invention to provide methods and apparatus to overcome the disadvantages and meet the needs discussed above.

It is also an object of the present invention to coordinate and integrate narrowband and broadband operations carried out in an AIN network, particularly wherein the broadband operations utilize wireless communications technology.

It is a further object of the invention to provide for coordination and control of narrowband and broadband communications in an AIN network by using an ISCP having one or more interfaces to elements of a wireless broadband network.

It is an object of the present invention to provide an AIN architecture which permits an ISCP to interact with a customer, during processing of an incoming or outgoing telephone call, via the customer's wireless broadband customer premises equipment.

It is also an object of the present invention to provide an AIN network architecture which allows a customer's wireless broadband customer premises equipment to transmit information to the ISCP of an AIN telephone network, particularly so that the ISCP can provide instructions to the narrowband network as to the processing of telephone calls.

It is a further object of the present invention to provide an AIN network architecture which offers integration of narrowband and broadband services, wherein the narrowband switch queries the ISCP in response to a telephone call, and the ISCP interacts with a subscriber via the subscriber's wireless broadband set-top terminal device prior to instructing the narrowband switch as to how to complete the call.

The present invention addresses the above needs and achieves the above stated objects by providing signaling communication between a service control point of the telephone network and broadband terminals devices, through a wireless broadband network.

The invention contemplates a communication system including elements of a telephone network and a wireless broadband network. The telephone network includes local telephone communication links, one or more trunk circuits and central office switching systems interconnected via the trunk circuits. The central office switching systems selectively provide switched call connections between at least two of the local communication links. An interoffice signaling network coupled to the central office switching systems provides signaling data communication links separate from the local communication lines and the trunk circuits. A service control point communicates with the central office switching systems via the interoffice signaling network. The service control point stores call processing data associated with a plurality of the local communication links for control of call processing through one or more of the central office switching systems. The wireless broadband network includes an interface point coupled to the service control point of the telephone network. The interface point facilitates signaling data communication between broadband terminals and the service control point, through a signaling channel of the wireless network.

The signaling communications between the service control point and the terminals may be one-way only, but preferably provides two-way signaling. Downstream signaling permits the service control point to send data relating to telephone calls to the terminals for display on an associated output device, typically a television set or monitor. Displays may relate to incoming calls, for example to provide Caller ID type telephone number and/or name information. Displays may relate to outgoing calls, for example to display dialed destination digits.

Upstream signaling communications between the service control point and the terminals permits a user at the terminal to input information that the service control point uses to determine how to control processing of the telephone calls through the central office switching systems. The combination of display and user input communication provides an interactive real-time control of telephone calls through the broadband network and terminal. For example, this combination permits a user at the terminal to screen incoming calls and select the type of disposition for each such call. Similarly, a parent or other user at the terminal can control processing of outgoing calls by other persons on the premises (e.g. minor children).

In normal operation, a broadband terminal presents video or other broadband information carried on the wireless network, typically via the associated television set. The subscriber may elect display and/or interactive control for either incoming calls, outgoing calls or both. During processing of a telephone call subject to the display or interactivity feature, a central office switching system processing the call will recognize a particular event in call processing. Recognition of the particular event triggers a query to the service control point. Ultimately, the service control point will return an instruction to the switching system to continue call processing. However, as part of its own processing, the service control point sends a message through the broadband network to the broadband terminal of the subscriber. If operational, the terminal may display call related information contained in the message, e.g. Caller ID information for an incoming call.

The display may also prompt the user to input information. If so, the broadband terminal transmits the subscriber input information upstream through the wireless broadband network to the service control point. In such a case, the service control point formulates its instruction to the central office switching system to control further processing of the telephone call, at least in part, based on the subscriber input information.

In another aspect, the present invention utilizes a specific implementation of the wireless network to provide broadband services, e.g. broadcast video, and to carry the various signaling information relating to interactive broadband services and the display and interactive telephone services. In this preferred embodiment, the wireless network includes a multi-channel broadband digital wireless broadcasting network and a public wireless packet data network. Subscribers terminals include means for processing selected broadband information from one of the channels to present broadband information, as well as an RF packet data modem for wireless communication of signaling messages to and from the terminals via the public packet data network. In the preferred embodiment, the packet data network also provides wireless data communications to other data devices, such as portable PCs. The wireless packet data network provides the signaling communication between terminal devices and a headend system providing interactive services.

The preferred embodiment of the communication system utilizes a digital simulcasting system to broadcast the broadband information. A signal including multiplexed channels is transmitted simultaneously from a plurality of spaced transmitting sites. The transmitting sites propagate the signal into substantially overlapping regions of at least a major portion or the intended reception area. At the subscriber premises, a terminal device receives the transmitted signal. At least a portion of the received signal is processed to acquire a digital transport stream from a selected one of the multiplexed channels. At least a portion of the transport stream is presented, e.g. in a form that is sensorially perceptible to a user.

Each of the multiplexed channels carries a multiplexed stream (transport stream) of digital data representing a plurality of programs. The programs may be audio or data, but in the currently preferred embodiment, a number of the broadcast programs comprise audio/visual information such as television programming. In such a television system, each program is digitally encoded into compressed digital data. A multiplexer combines the compressed digital data for a group of programs into one of the digital multiplexed data streams for transport through one of the channels. The presentation of one program to a user entails selecting one of the channels, selecting data from the multiplexed stream of digital data carried in that channel, and reproducing the selected data as the sensorially perceptible information, e.g. as an audio/visual output through a television set.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

FIG. 6A depicts the structure of the headends, and FIG. 6B depicts the signal processing circuitry at the actual transmitter locations.

BEST MODE FOR CARRYING OUT THE INVENTION

The present invention contemplates the combination of a wireless communication from the ISCP to a subscriber's set-top terminal through a broadband wireless network with AIN type processing of a call through the narrowband telephone network.

At some point during processing of a telephone call, a central office switching system will recognize an event in call processing as a 'Point in Call' (PIC) which triggers a query to the ISCP. Ultimately, the ISCP will return an instruction to the switching system to continue call processing. However, as part of its own processing, the ISCP sends a message through the broadband network to the broadband set-top terminal of the subscriber. If operational, the set-top may display call related information contained in the message, e.g. Caller ID information for an incoming call.

The display may also prompt the user to input information. If so, the set-top terminal will transmit the subscriber input information upstream through the wireless broadband network to the ISCP. In such a case, the ISCP formulates its instruction to the central office switching system to control further processing of the telephone call, at least in part, based on the subscriber input information.

Figure 1:
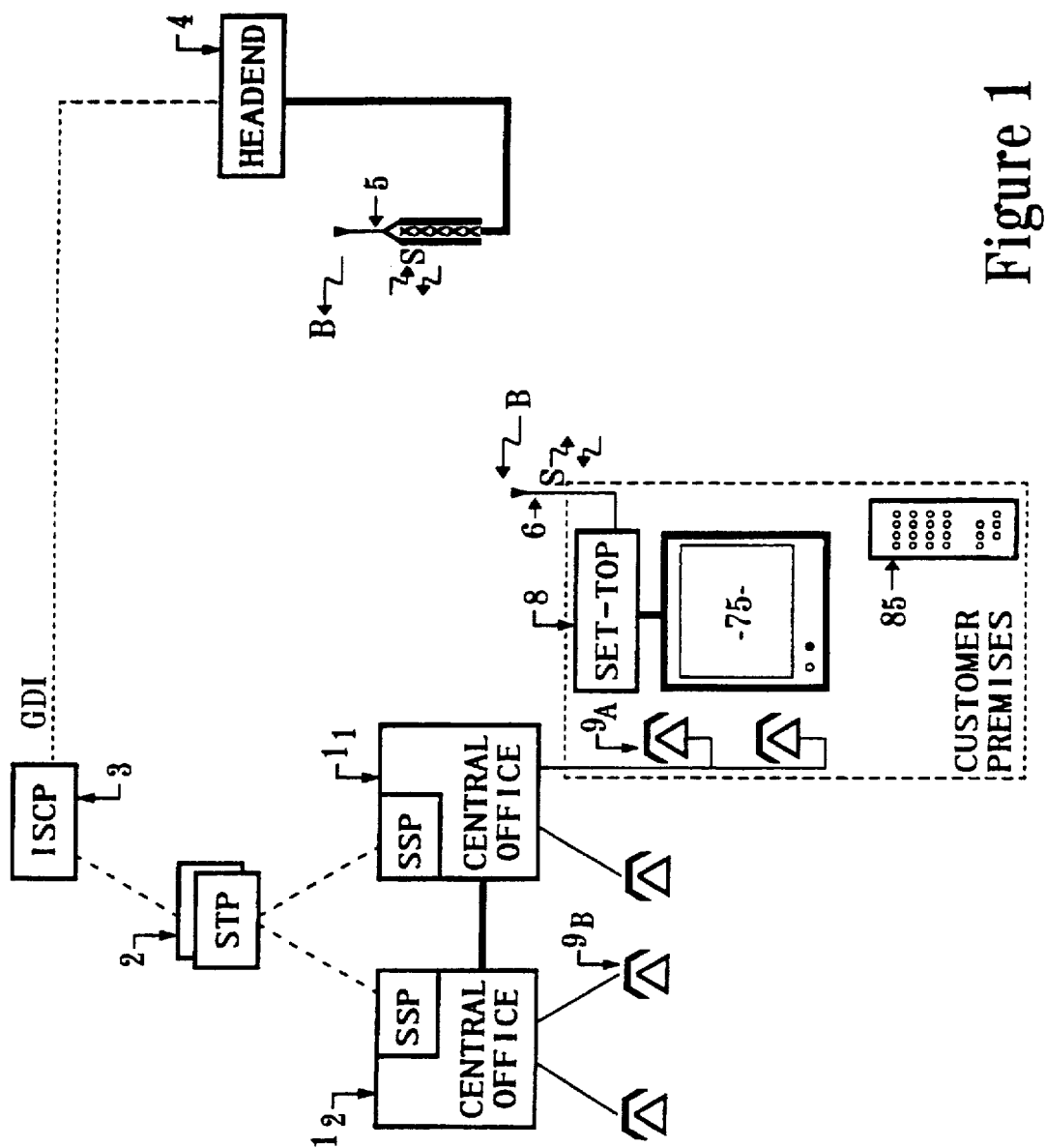
FIG. 1 is a schematic block diagram of an advanced intelligent network providing ISCP control and ISCP interaction with broadband customer premises equipment through a wireless broadband network.

FIG. 1 provides a simplified block diagram of a public switched telephone network (PSTN) and a broadband wireless network implementing the present invention. The telephone network includes a switched traffic network and a common channel signaling network used to control the signaling for the switched telephone traffic network. In FIG. 1, the telephone network (operated by a combination of local carriers and interexchange carriers) includes a number of end office type central office switching systems 1 providing connections to and from local communication lines coupled to end users telephone station sets 9. The telephone network typically will also include one or more tandem switching offices (not shown) providing trunk connections between end offices. As such, the network consists of local communication links and a series of switching offices interconnected by voice grade trunks.

Although shown as telephones in FIG. 1, the terminal devices 9 can comprise any communication device compatible with the local communication line. Where the line is a standard voice grade telephone line, for example, the terminals could include facsimile devices, modems etc. Also, FIG. 1 shows connections to the station via lines, and typically these links are telephone lines. It will be apparent to those skilled in the art, however, that these links may be other types of communication links, such as wireless links.

The lines and trunks through the offices 1 carry the communication traffic of the telephone network. The telephone network, however, also includes a common channel interoffice signaling (CCIS) network carrying a variety of signaling messages, principally relating to control of processing of calls through the traffic portion of the network.

The CCIS network includes packet data links (shown as dotted lines) connected to appropriately equipped central office switching systems 1 and a plurality of packet switches, termed Signaling Transfer Points (STPs) 2. To provide redundancy and thus a high degree of reliability, the STPs 2 typically are implemented as mated pairs of STPs. The CCIS network of the telephone system operates in accord with an accepted signaling protocol standard, preferably Signaling System 7 (SS7).

In the preferred embodiment shown in FIG. 1, each central office 1 has at least minimal SS7 signaling capability, which is conventionally referred to as a signaling point (SP) in reference to the SS7 network. Preferably each switching office is programmed to recognize identified events or points in call (PICS). In response to a PIC, central office 1 triggers a query through the CCIS signaling network to an Integrated Service Control Point (ISCP) 3 for instructions relating to AIN type services. Central office switching systems 1 having AIN trigger and query capability are referred to as Service Switching Points (SSPs).

The above described data signalling network between the SSP type central offices and the ISCP is preferred, but other signalling networks could be used. For example, instead of the packet switched type links through the STP's, a number of central office switches, an ISCP and any other signaling nodes could be linked for data communication by a token ring network. Also, the SSP capability may not always be available at the local office level, and several other implementations might be used to provide the requisite SSP capability. For example, none of the end office switches may have SSP functionality. Instead, each end office would connect through a trunk to a tandem office which has the SSP capability. The SSP tandem then communicates with the ISCP via an SS7 type CCIS link, as in the implementation described above. The SSP capable tandem switches are digital switches, such as the 5ESS switch from AT&T; and the non-SSP type end offices might be 1A analog type switches.

The ISCP 3 is an integrated system. Among other system components, the ISCP 3 includes a Service Management System (SMS), a Data and Reporting System (DRS) and the actual database referred to as a Service Control Point (SCP). The ISCP also typically includes a terminal subsystem referred to as a Service Creation Environment or SCE for programming the database in the SCP for the services subscribed to by each individual business customer.

The components of the ISCP are connected by an internal, high-speed data network, such as a token ring network. The internal data network also typically connects to a number of interfaces for communication with external data systems. One such interface provides Generic-Data-Interface (GDI) protocol type communication, typically over a packet switched data link separate from the telephone traffic network and the CCIS network. As discussed more fully later, the ISCP 3 preferably utilizes the GDI link to communicate with a broadband network interface point, typically a headend 4, which in turn provides communications with a subscriber's set-top terminal 8. Other data communications interfaces to the ISCP 3 could carry the signaling information to and from the headend 4, as discussed in more detail in the above incorporated U.S. Pat. No. 08/563,400 application.

The central office switches 1 typically consist of programmable digital switches with CCIS communications capabilities. One example of such a switch is a 5ESS type switch manufactured by AT&T; but other vendors, such as Northern Telecom and Seimens, manufacture comparable digital switches which could serve as the SSPs and SPs. The SSP type implementation of such switches differs from the SP type implementation of such switches in that the SSP switch includes additional software to recognize the full set of AIN triggers and launch appropriate queries.

The telephone network may also include one or more intelligent peripherals (not shown) to provide enhanced announcement and digit collection capabilities and/or speech recognition. Commonly assigned copending U.S. patent application Ser. No. 08/248,980, filed May 24, 1994, entitled "Advanced Intelligent Network with Intelligent Peripherals Interfaced to the Integrated Services Control Point" (attorney docket no. 680-076) provides a more detailed disclosure of an AIN type telephone network, including the structure of SSP switches, the structure of an ISCP, the structure of an intelligent peripheral and the structure of the second signaling network; and the disclosure of those structures and the operation thereof from that application is incorporated herein in its entirety by reference.

The system shown in FIG. 1 also includes elements of a wireless broadband communication network providing at least downstream transport of broadband information (B) and two-way transport of narrowband signaling information (S). The broadband network can comprise any wireless network providing at least broadband transport and addressable downstream signaling to the individual set-top terminals 8. Preferably, the wireless network also carries upstream signaling information from the set-top terminals 8 to the headend 4. The wireless network may utilize analog broadband transmission, similar to that in present day wireless cable type systems (see e.g. U.S. Pat. Nos. 5,437,052 and 5,394,559 to Hemmie et al.). The preferred embodiment discussed in detail later utilizes enhanced digital communications via the wireless cable broadband channels and an associated wireless packet data network carrying the signaling information.

In the simplified illustration, the wireless broadband network includes a headend 4 and at least one wireless antenna 5. The antenna 5 radiates RF signals, including broadband information (B) and the downstream portion of the signaling information (S), sent from the headend 5. The antenna also receives wireless RF transmissions of the upstream signaling information (S) and supplies that information to the headend for processing. As discussed in more detail below, the antenna actually comprises a plurality of antennae broadcasting the broadband information (B) and one or more separate antennae for the signaling information (S).

At a customer premises, where that customer subscribes to both telephone services and wireless broadband services, the customer will have one or more telephones $9_A$ coupled to a central office switch, such as switch $1_1$. The equipment at that customer premises will also include one or more antennae 6 and a set-top terminal device 8. The antenna 6 receives RF signals, including broadband information (B) and the downstream portion of the signaling information (S), sent from the headend 4 through antenna 5. The antenna 6 also provides an RF radiation of the upstream signaling information (S) from the set-top terminal 8 for wireless transmission to the antenna 5 and the headend 4.

Figure 4:
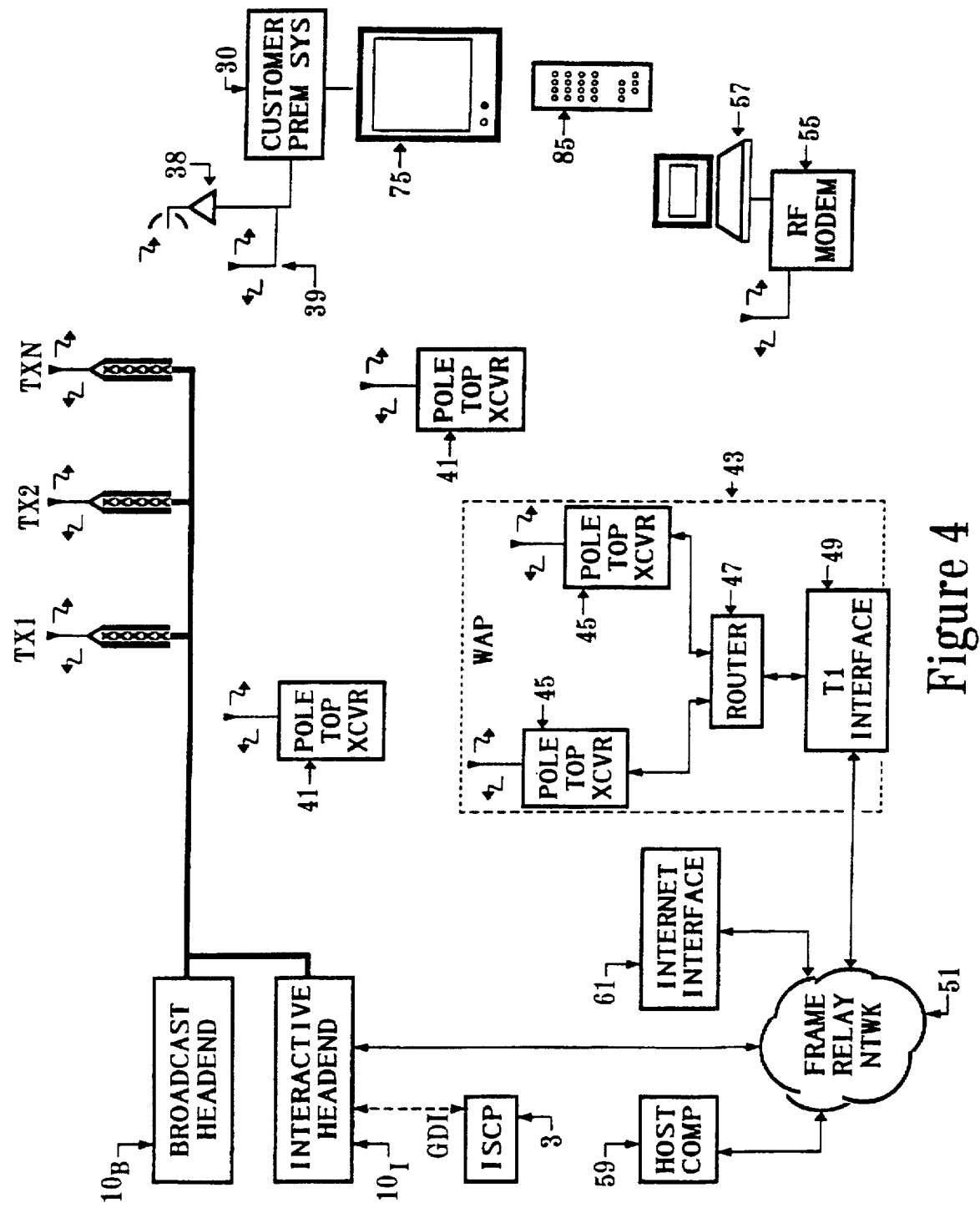
FIG. 4 is a simplified functional block diagram of the preferred embodiment of the wireless communication network utilized in the present invention.

As discussed in more detail below, the antenna 6 actually comprises two separate antennae, one for receiving the RF broadcast of the broadband information (B) and a second antenna for radiating and receiving the two-way signaling information (S). In the preferred embodiment, one or more of the set-top terminals at the customer premises are elements of an overall customer premises system 30 (FIG. 4). In later discussions, the set-top terminal also is often referred to as a 'Digital Entertainment Terminal' (DET).

In operation, the headend 4 broadcasts a plurality of broadband information signals, typically including video programs. A user activates a remote control 85 to select a program. In response, the set-top terminal 8 selects the signals relating to that program from the received wireless broadband information broadcast. The set-top terminal 8 processes the selected broadband signals as appropriate to produce a signal for driving a television set 75. This processing may include demodulation, decryption, conversion from digital to analog, etc. The resulting output is a standard signal for displaying the selected broadband program information on the television 75.

At least for signaling purposes, the set-top terminal 8 is addressable from the headend 4. The headend 4 sends and receives addressed signaling information (S) from each terminal, to control broadband services and/or to provide interactive services. The control functionality, for example, may relate to providing necessary decryption information to permit the set-top terminal to decode a selected pay-per-view program. For interactive services, the upstream signaling information includes subscriber inputs, and the downstream signaling information includes control information and/or information for display on the television 75, e.g. as a text or graphics overlay on displayed broadband video information. The interactive services may also involve transmission of at least some information to the set-top terminal through one of the broadband channels.

In accord with the present invention, the addressed signaling communication link between the headend 4 and the set-top terminal 6 also provides downstream message transport from the ISCP 3 and the set-top terminal 8. This type of communication provides information, relating to a call to or from one of the telephones $9_A$, for display on the television 75. In the preferred embodiment, the signaling link also provides upstream data communication. The upstream signaling data communication may transport user input information to the ISCP 3, to control subsequent processing of a call to or from one of the telephones $9_A$.

Discussion of call processing will assist in understanding the operation of the present invention. In this regard, the following discussion first addresses normal telephone call processing and then call processing for customers having the integrated service in accord with the present invention.

An end office switching system 1 shown in FIG. 1 normally responds to a service request on a local communication line connected thereto, for example an off-hook from a station 9 followed by dialed digit information, to selectively connect the requesting line to another selected local communication line. For normal telephone calls, the calling party dials in a seven digit number or the number 1+ a ten digit number to uniquely identify a destination station within North America. Longer numbers are dialed for international calls. The connection can be made locally through only the connected end office switching system but typically will go through a number of central office switching systems 1, and possibly one or more tandem offices (not separately shown).

In the normal call processing, the central office switching system responds to an off-hook and receives dialed digits from the calling station. The central office switching system analyzes the received digits to determine if the call is local or not. If the called station is local and the call can be completed through the one central office, the central office switching system connects the calling station to the called station. If, however, the called station is not local, the call must be completed through one or more distant central offices, and further processing is necessary. If at this point the call were connected serially through the trunks and appropriate central offices between the caller and the called party using in-band signalling, the trunks would be engaged before a determination is made that the called line is available or busy. Particularly if the called line is busy, this would unnecessarily tie up limited voice trunk circuit capacity. The CCIS system through the STP's was developed to alleviate this problem.

In the CCIS type call processing method, the originating end office switching system 1 suspends the call and sends a message through the CCIS network to the end office switching system serving the destination telephone line. The terminating end office determines whether or not the called line is busy. If the called line is busy, the terminating end office so informs the originating end office via CCIS message, and the originating end office provides a busy signal to the calling station. If the called line is not busy, the terminating end office so informs the originating end central office. The originating office provides ringback to the caller, and the terminating office applies ringing current to the line to the called party. When the telephone station connected to the called line goes off-hook, the terminating switching office informs the originating switching office, and the two offices establish a telephone connection via the trunks and end offices (and/or tandem offices) of the network between the calling and called stations.

For an AIN type service, such as call redirection based on data stored in the ISCP 3, one or more of the end offices 1 and/or tandems are SSP capable and detect one of a number of call processing events, each identified as a 'point in call' (PIC), to trigger AIN type processing. Specifically, in response to such a PIC, an SSP switching office suspends call processing, compiles a call data message and forwards that message via common channel interoffice signalling (CCIS) links and one or more STPs 2 to an ISCP 3. If needed, the ISCP 3 can instruct the particular switching office to obtain and forward additional information. Once sufficient information has reached the ISCP 3, the ISCP 3 accesses its stored data tables and/or data in an external database (not shown) to translate the received data into a call control message and returns the call control message to the switching office 1 via one or more of the STPs 2 and the appropriate CCIS links. The SSP office uses the call control message to complete the particular call through the public switched network in the manner specified by the subscriber's data file in the ISCP 3.

In an actual implementation of the present invention, the network of FIG. 1 would continue to offer a wide range of narrowband services using the standard call processing routines common today, including those outlined above. The broadband network would continue to offer broadcast and interactive services, such as described in the above incorporated U.S. Pat. No. 08/491,515 application (attorney docket no. 680-130D). However, the present invention also facilitates integrated service and/or customized call routing through the network for customers having both telephone service and wireless broadband service.

In practice, one or more triggers are set in the subscriber profile information relating to the telephone line to stations $9_A$ in the end office switch 1 serving the integrated service type customer's premises. The trigger may relate to any one of a variety of call processing conditions. Detection of a trigger causes the SSP capable end office switch $1_1$ to query the ISCP 3, and the ISCP 3 in turn initiates communication with the set-top terminal 8. If the set-top terminal is active at the time, the set-top terminal provides appropriate signals to display call related information, e.g. as an overlay on the current video output displayed on television 75. The set-top terminal may also relay input information from the user back through the headend 4 to the ISCP 3.

Ultimately, the ISCP 3 provides one or more instructions to the end office switch $1_1$ as to how to process the particular call. The call processing instructions, and the final disposition of any given call, depend on customized call processing information stored in the SCP database within the ISCP 3 and/or user input information transmitted to the ISCP 3 from the set-top terminal 8. More detailed discussions of specific call processing examples are set forth below with regard to drawing FIGS. 2 and 3.

Figure 2:
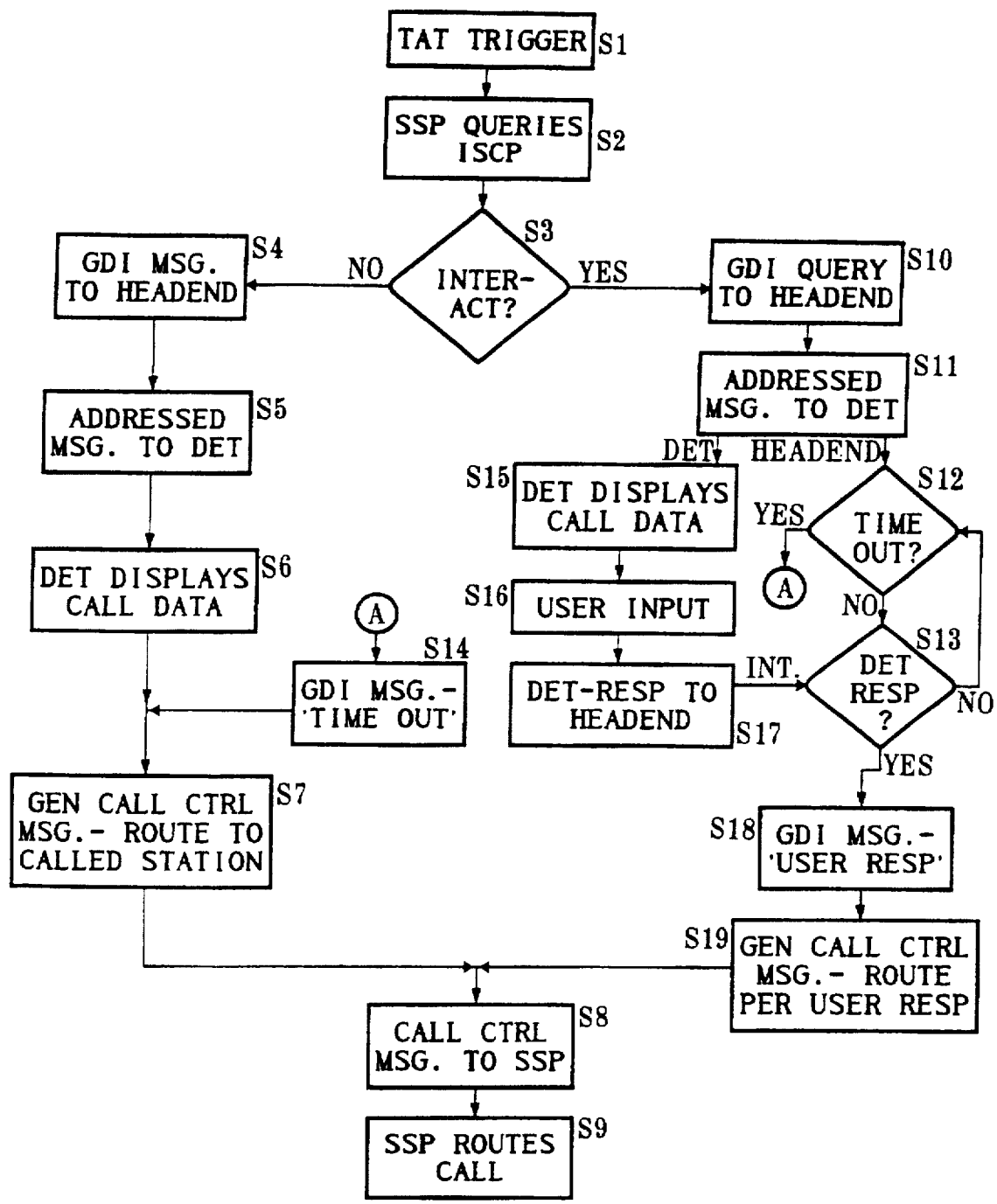
FIG. 2 is a simplified flow diagram illustrating the processing of an incoming call in accord with the present invention.

FIG. 2 is a simplified flow chart of call processing in accord with the present invention, for incoming calls. For an incoming call, the subscriber profile information in the serving central office switching system $1_1$ includes a terminating attempt trigger (TAT). The central office switching system $1_1$ detects a TAT trigger whenever it attempts to complete a call to a telephone number of the particular subscriber.

If the call is an intra-office call, call processing will reach the point in call (PIC) and activate the TAT trigger when the central office switch $1_1$ attempts to complete the call to the called line. To provide a more detailed illustrative example below, it is assumed that the incoming call is an interoffice call, for example, that a caller at station $9_B$ dials the telephone number of the subscriber at station $9_A$.

The user at station $9_B$ picks up his phone and dials the number of station $9_A$. An administrative module processor within the end office switch $1_2$ loads subscriber profile information from disc storage into an available register in a call store. The number for station $9_A$ resides in end office $1_1$. The central office $1_2$ generates an Initial Address Message (IAM) type SS7 signaling message and transmits that message with appropriate addressing over a packet data link to one of the STPs 2. The STP 2 looks at the address in the IAM message and determines that the message is for end office $1_1$. The STP therefore executes its normal translation and routing process to forward the message to the correct end office $1_1$.

End office $1_1$ receives the IAM message which includes the called telephone number. To process the type of call under consideration here, the central office $1_1$ is a full SSP capable office, i.e. capable of detecting AIN triggers and communicating with an ISCP 3. As part of its processing in response to the IAM message, the terminating SSP central office 1 retrieves relevant information from the subscriber profile for the line to station $9_A$. In response to that information, the terminating central office $1_1$ detects the TAT type trigger set for incoming calls to the subscriber's telephone number (step S1 in FIG. 2).

In response to the trigger, the terminating central office $1_1$ launches a query to the ISCP 3 (S2). More specifically, the terminating central office $1_1$ formulates an initial query type Transaction Capabilities Applications Protocol (TCAP) message. The terminating central office $1_1$ transmits the query message with appropriate addressing over a packet data link to one of the STPs 2. The STP 2 looks at the address in the query message and determines that the message is for ISCP 3. The STP therefore executes its normal translation and routing process to forward the message to the ISCP.

The TCAP query message contains considerable information relating to the particular call, including an identification of the type of triggering event, the dialed digits and calling party telephone number. The ISCP 3 utilizes a portion of this information to retrieve a call processing record (CPR) from its internal database. In the present incoming call example, the ISCP utilizes the called party telephone number identified by the dialed digits to retrieve a CPR for the called integrated service customer premises.

Different AIN service customers may customize their individual services to meet their own personal needs. For purposes of the present example, it is assumed that the customized services for processing of incoming calls to integrated service customers break down into two general classes or categories. One such class involves only display of relevant information, typically to provide a Caller ID type display on the television set 75 for incoming telephone calls. The other class provides an interactive control of the call processing in response to real time user input information. In the logical flow of processing illustrated in FIG. 2, processing therefore branches at step S3 based on whether or not the CPR indicates an interactive type service.

For a non-interactive type service, i.e. providing display only, processing branches from step S3 to step S4. In step S4, the ISCP 3 sends a GDI protocol message to the headend 4. In the present system, the headend 4 serves its normal broadband network functions and serves as an interface point between the ISCP and the wireless broadband network, although other interface points could serve this additional function.

The GDI message contains information about the incoming call, including at least the telephone number of the calling station 9. The ISCP 3 may query a separate database to obtain additional information for inclusion in the GDI message, for example name information from a line identification database (LIDB).

The GDI message also identifies the called party, e.g. by telephone number. The headend or other interface point formulates a message in the appropriate format for signaling communications via the particular wireless network. This message includes information regarding the incoming telephone call (e.g. telephone number and name of the caller) from the GDI message. The headend 4 translates the identification of the calling party, e.g. the telephone number, into the wireless network signaling address for that subscriber's set-top terminal and includes that address in the message. At step S5, the headend transmits that addressed signaling message through the wireless broadcast from antenna 5 to antenna 6 and set-top terminal 8 (here referred to as a DET).

The DET 8 decodes the signaling message and operates in accord with information contained therein. In the present example, the message to the DET instructs the DET to generate a display of call related data from the addressed signaling message (S6). The DET preferably provides a text and/or graphics overlay capability whereby the DET produces a television signal containing video from the currently selected program channel together with a textual or graphical representation of the information, for display on the associated television set 75. In a typical example, this results in a display of the telephone number and the name associated with the station $9_B$, as retrieved from the line identification database.

Since the call is not interactive, the ISCP 3 need not wait for additional information from the DET. While the DET 8 is providing the display, the ISCP 3 therefore proceeds to step S7. In that step, the ISCP generates a call control type TCAP message providing instructions as to further processing of the call in accord with the called customer's CPR. In the present example, because the customer has a display only type service without interactive screening or the like, the call control message includes an appropriate instruction to route the call to the called telephone number, i.e. the line to station $9_A$.

In step S8, the ISCP 3 transmits the call control message back to the SSP office that initially launched the query (back in step S2). More specifically, the ISCP 3 includes an address for the central office switching system $1_1$ in the call control message and sends that message over a packet data link to one of the STPs 2. The STP 2 in turn routes the message through the appropriate link to the central office switching system $1_1$.

The SSP type central office $1_1$ utilizes information from the TCAP call control message to route the call (S9). At this point in the present example, the call is to be completed to the station $9_A$. The central office $1_1$ suspended call processing after receipt of the IAM message from the originating office $1_2$ (i.e. when it detected the TAT trigger). The central office $1_1$ now resumes call processing in response to the TCAP call control message. In the present case, the end office $1_1$ formulates an Address Complete Message (ACM), styled as a response to the original IAM message.

The ACM includes a variety of information, including a calling party status indicator, e.g. line free or busy. Assuming that the called line is not busy, the end office $1_1$ rings the station $9_A$ and generates an Address Complete Message (ACM) indicating that it received the request for a call and that the number is not busy. The end office $1_1$ addresses the ACM message to the central office $1_2$ and sends the ACM message back through an STP 2 and the appropriate packet data links. In response to the ACM message, the originating end office $1_2$ applies a ringback tone signal to the line to station $9_B$.

As soon as the phone $9_A$ is answered at end office $1_1$, that office sends an Answer Message (ANM) back to end office $1_2$ through the STP 2, indicating that the phone $9_A$ was picked up; and at that time the actual telephone traffic trunks are connected together between the two end offices. End office $1_2$ connects the line to station $9_B$ to the trunk circuit, and end office $1_1$ connects the line to station $9_A$ to the trunk circuit, so that communication is established.

As noted above some customers will subscribe to a service requiring an interactive function before routing of the call. Assume again that a caller at station $9_B$ dials the telephone number of the subscriber at station $9_A$, however, the subscriber at the called station now has subscribed to an interactive call processing service. In this particular example, assume that the subscriber has elected to have Caller ID information displayed, and then the subscriber has the option to specify how to route the call.

In this case, call processing begins exactly as in the earlier example until the logical process flow reaches step S3. At step S3, however, the ISCP recognizes from the called party's CPR that the service involves an interaction through the broadband network. Call processing therefore branches from step S3 to step S10. In step S10, the ISCP 3 sends a GDI protocol query message to the headend 4. This query message instructs the headend to send back certain requested information. In the present example, the GDI query effectively is an instruction to send back subscriber input information.

The GDI query message includes information regarding the call identical to the information contained in the GDI message discussed above with regard to step S4, e.g. the calling party telephone number and associated name. The GDI query message also identifies the called party, e.g. by telephone number. The headend 4 or other interface point formulates a message in the appropriate format for signaling communications via the particular wireless network. This message includes information regarding the incoming telephone call (e.g. telephone number and name of the caller) from the GDI query message. The headend 4 translates the identification of the calling party, e.g. the telephone number, into the wireless network signaling address for that subscriber's set-top terminal and includes that address in the message. At step S11, the headend transmits that addressed signaling message through the wireless broadcast on the channel assigned for downstream signaling information, from antenna 5 to antenna 6 and set-top terminal or DET 8.

After transmission of the message in step S11, two processes run in parallel. The headend 4 or other interface point runs steps S12 and S13, which form a timing loop, while the DET 8 runs process steps S15 to S17 to provide a display and communication of a user input back to the headend. For simplicity of discussion consider first the timing loop.

A customer may not respond because the set-top terminal 8 is not currently active or the customer is momentarily not watching the television 75. Alternatively, the subscriber may choose not to respond as a way to allow routing of the call in accord with a predefined default procedure specified by the subscriber and controlled by corresponding information in the subscriber's CPR in the ISCP 3. The timing loop detects the lack of a response by a person at the called subscriber's premises within a predetermined interval or time period.

At step S12, the headend 4 determines if the predetermined interval has elapsed since transmission of the addressed message in step S11. If the interval has not timed out, then the headend proceeds to check if a response has been received from the addressed DET (S13). If not, processing returns to step S12. If the headend 4 receives no response from the addressed DET 8 within the interval, then the step S12 will detect expiration of the interval and cause process flow to branch to step S14.

At step S14, the headend 4 formulates a GDI message responsive to the GDI query from the ISCP (see step S10). This GDI response message indicates that the DET 8 did not respond within the predetermined time interval. The headend 4 transmits the GDI response message back to the ISCP 3 over the data link.

The ISCP 3 uses the called subscriber's CPR to determine how to process the call under the present circumstances, in the present case, when there has been no response within the allotted interval. Although each subscriber may elect different default routings for this non-response situation, assume here that the customer has elected to have such calls completed to the telephone stations $9^A$.

The ISCP 3 therefore responds to the GDI message received in step S14 by generating a call control message for routing the call through to the called telephone number, i.e. the line to station $9_A$ (S7). In step S8, the ISCP 3 transmits the message back to the SSP office that initially launched the query (back in step S2). More specifically, the ISCP 3 includes an address for the SSP central office switching system $1_1$ in the call control message and sends that message over a packet data link to one of the STPs 2. The STP 2 in turn routes the message through the appropriate link to the central office switching system $1_1$. The SSP type central office $1_1$ utilizes information from the TCAP call control message to route the call (S9), in exactly the same manner as discussed above with regard to the earlier example.

Consider now the DET operations and the user input in more detail. As discussed above, the headend 4 transmits an addressed signaling message through the wireless broadcast from antenna 5 to antenna 6 and set-top terminal or DET 8 (S11). The DET 8 decodes the signaling message and operates in accord with information contained therein. In the present example, the message to the DET instructs the DET to generate a display of call related data from the message (S15). The DET 8 preferably displays the telephone number and associated name information for the calling station $9_B$ and the television 75 in the manner described above relative to step S6.

In a similar manner, the display generated in response to the addressed message includes prompting information requesting a user input specifying a selected disposition of the incoming call. For example, the prompt may provide a menu of options. The options include routing to the customer premises and one or more alternate destinations, such as busy tone, voice mail, secretarial service, etc. Alternatively, the display may prompt the subscriber for input of a destination telephone number, which may be that of the line to the customer premises or any other number that the user may choose.

Upon viewing the information that the DET 8 displays on the television 75, the user activates the remote control 85 to input desired control information (S16) The DET 8 recognizes the data in the remote control signal as a user input of a type intended for transmission to the headend 4. The DET therefore compiles a signaling message containing the input information. The DET 8 transmits the signaling message back upstream through the channel assigned to upstream signaling information (S17). As part of this transmission, the antenna 6 radiates the message as an RF signal on the appropriate channel, and the antenna 5 supplies that channel to the headend for further processing of the message.

Receipt of the response message from the DET 8 causes an interrupt in the timing loop running in the headend 4. Specifically, the response detection step S13 now produces an affirmative result, and processing by the headend branches to step S18.

At step S18, the headend 4 again formulates a GDI message responsive to the GDI query from the ISCP (see step S10). In step S18, however, the GDI response message includes the user input information received from the DET 8. The headend 4 transmits the GDI response message back to the ISCP 3 over the data link.

The ISCP 3 uses the called subscriber's CPR to determine how to process the call under the present circumstances, in the present case, in response to a particular input by the user. For example, if the display provided a menu of choices and the input is a digit representing the user's selection of a choice from the menu, then the ISCP 3 uses the CPR to translate the input digit into the appropriate routing instruction. If the user input a destination number, then the ISCP formulates a routing instruction based on that number. Individual subscribers can specify their own customized processing based on their expected input selections, for example to achieve any desired processing of calls that they have screened in real time through the display and user input procedure.

The ISCP 3 responds to the GDI message received in step S18 by generating a call control message for routing the call in accord with the user's input information (S19). In step S8 the ISCP 3 transmits this call control message back to the SSP office that initially launched the query as in the earlier examples, and in step S9 the SSP type central office $1_1$ utilizes information from the TCAP call control message to route the call. If the user operating the remote control 85 at the customer premises elected to allow completion to that location, then the central office $1_1$ proceeds to complete the call in exactly the same manner as discussed above with regard to the earlier examples. However, the call control message may specify other call processing treatments, and the SSP central office $1_1$ will respond accordingly.

For example, the user may refuse the call, and the subscriber's CPR may specify a routing to a busy signal. In this case, the central office $1_1$ responds to the original IAM message from the originating office $1_2$ by formulating and sending an Address Complete Message (ACM) indicating that the called line is busy. The message goes back through the packet data links and an STP 2 to the originating central office $1_2$. In response, that office connects the line from calling station $9_B$ to an internal busy tone trunk, and the caller hears a busy signal.

If the user input an alternate destination number or the CPR specifies an alternate destination number, the SSP central office $1_1$ will complete the call in a manner similar to that used to complete the call to the station $9_A$ but to a line identified by the destination number included in the call control message. In this manner, the system may route the call to any desired alternate destination, such as a voice mail system, a secretarial service, etc.

Figure 3:
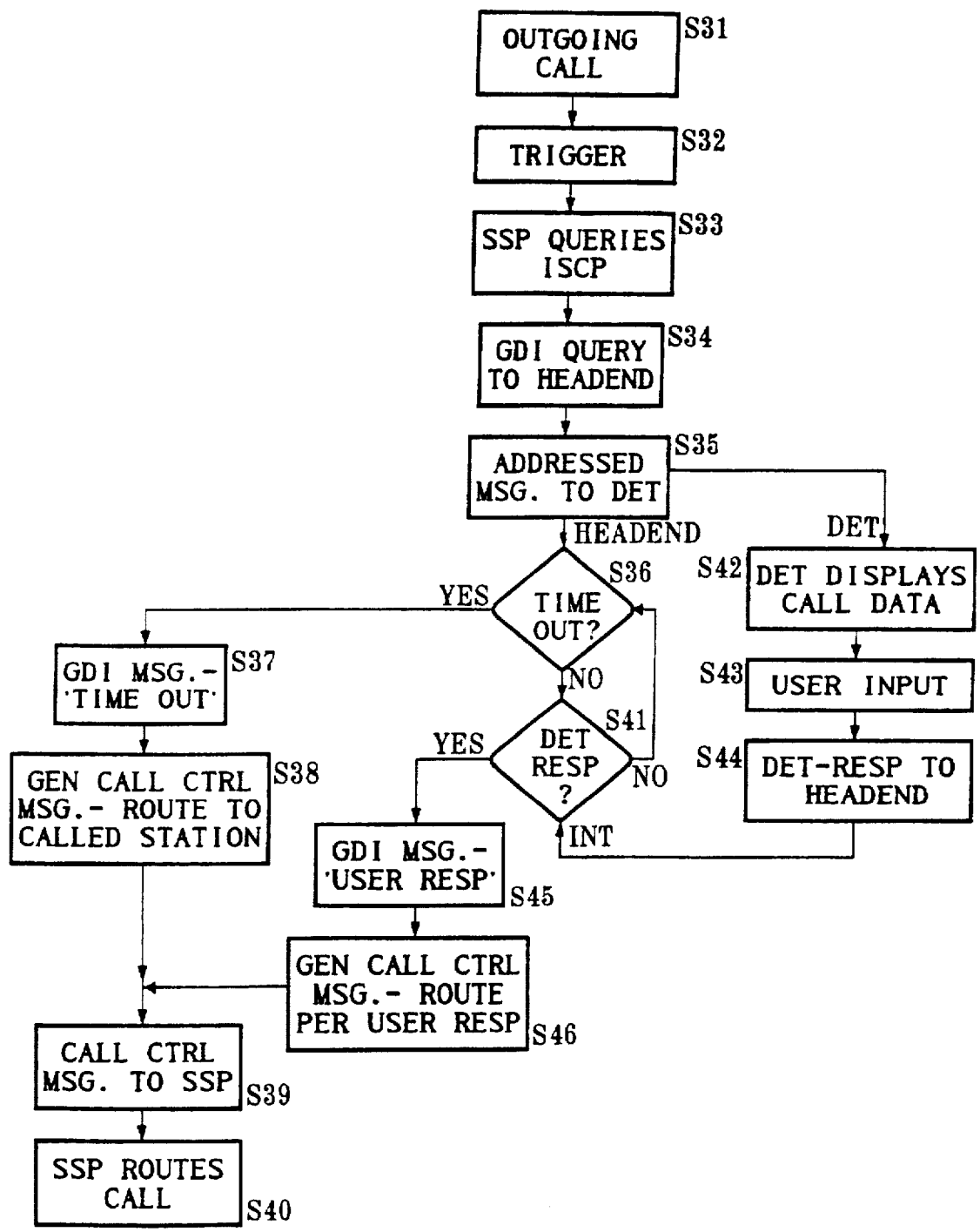
FIG. 3 is a simplified flow diagram illustrating the processing of an outgoing call in accord with the present invention.

Consider now the processing of outgoing calls from an integrated service type customer premises, wherein the subscriber has established an interactive processing of outgoing calls. For example, a subscriber may desire to screen outgoing calls while watching the television, to allow the subscriber to limit calls by children. FIG. 3 provides a simplified flow chart depicting the processing of outgoing calls from such a subscriber's premises.

The processing of the outgoing call begins (S31) when a person lifts one of the subscriber premises telephone stations $9_A$ off-hook. An administrative module processor within the end office switch $1_1$ loads subscriber profile information from disc storage into an available register in a call store. Again, the central office $1_1$ functions as an SSP capable of detecting trigger events and communicating with the ISCP 3. The profile information therefore will specify at least one of several AIN triggers that might apply to outgoing calls, e.g. one of several different dialing plan type triggers.

The SSP central office switch $1_1$ processes the call in the normal manner until it detects a trigger event (S32). For purposes of this example, assume that the relevant trigger is an off-hook delay type trigger. For this type of trigger, the central office $1_1$ will trigger in response to all outgoing calls, after an off-hook and sufficient time to collect destination digits dialed by the calling party.

In response to the trigger, the SSP central office $1_1$ launches a query to the ISCP 3 (S33). More specifically, the central office $1_1$ formulates an initial query type Transaction Capabilities Applications Protocol (TCAP) message. The SSP central office $1_1$ transmits the query message with appropriate addressing over a packet data link to one of the STPs 2. The STP 2 looks at the address in the query message and determines that the message is for ISCP 3. The STP therefore executes its normal translation and routing process to forward the message to the ISCP.

The TCAP query message contains considerable information relating to the particular call, including an identification of the type of triggering event and the dialed digits and calling party telephone number. The ISCP 3 utilizes a portion of this information to retrieve a call processing record (CPR) from its internal database. In the present outgoing call example, the ISCP utilizes the calling party telephone number identified by automatic number identification (ANI) information, compiled by the central office $1_1$ and included in the initial query message, to retrieve a CPR for the integrated service customer.

Again, different AIN service customers may customize their individual services to meet their own personal needs. For purposes of the present example, it is assumed that the relevant subscriber has selected a real-time screening service using an interactive session through the set-top terminal 8. The subscriber may elect to apply outgoing call screening under all conditions. However, in the preferred embodiment, the CPR specifies conditions under which screening does or does not apply. The screening may apply only at certain times of the day or week, e.g. when the subscriber normally expects to be watching television through the interactive set-top. Alternatively, when the user turns on the set-top, the set-top may execute a signaling routine (possibly with PIN number entry) to notify the headend 4. The headend in turn might provide a GDI protocol signal to the ISCP indicating that the subscriber is active and therefore outgoing call screening applies. The CPR may specify a variety of other criteria distinguishing when or when not to provide the real-time screening interactivity.

Based on the CPR, if screening does not apply to the present call, then the ISCP would instruct the SSP to route the call as dialed. For purposes of illustration and discussion here, however, it has been assumed that the screening applies to the present call. The CPR therefore indicates a need to initiate an interactive query to the subscriber through the broadband network.

The ISCP 3 sends a GDI protocol query message to the headend 4 (S34). This query message instructs the headend to send back certain requested information. In the present example, the GDI query effectively is an instruction to send back subscriber input information.

The GDI query message again includes information regarding the call, such as the fact that this is an outgoing call, the calling party telephone number and the digits dialed. The headend 4 or other interface point formulates a message in the appropriate format for signaling communications via the particular wireless network. This message includes some of the information regarding the outgoing telephone call from the GDI query message (e.g. the dialed digits and the outgoing call status). The headend 4 translates the calling party telephone number into the wireless network signaling address for that subscriber's set-top terminal 8 and includes that address in the message. At step S35, the headend transmits that addressed signaling message through the wireless broadcast on the channel assigned for downstream signaling information, from antenna 5 to antenna 6 and set-top terminal or DET 8.

After transmission of the message in step S35, two processes run in parallel. The headend 4 or other interface point runs steps S36 and S41, which form a timing loop, while the DET 8 runs process steps S42 to S44 to provide a display and communication of a user input back to the headend. For simplicity of discussion consider first the timing loop.

A customer may not respond because the set-top terminal 8 is not currently active or the customer is momentarily not watching the television 75. Alternatively, the subscriber may choose not to respond as a way to allow processing of the outgoing call in accord with a predefined default procedure specified by the subscriber and controlled by corresponding information in the subscriber's CPR in the ISCP 3. The timing loop detects the lack of a response by a person at the called subscriber's premises within a predetermined interval or time period.

At step S36, the headend 4 determines if the predetermined interval has elapsed since transmission of the addressed message in step S35. If the interval has not timed out, then the headend proceeds to check if a response has been received from the addressed DET (S41). If not, processing returns to step S36. If the headend 4 receives no response from the addressed DET 8 within the interval, then the step S36 will detect expiration of the interval and cause process flow to branch to step S37.

At step S37, the headend 4 formulates a GDI message responsive to the GDI query from the ISCP (see step S34). This GDI response message indicates that the DET 8 did not respond within the predetermined time interval. The headend 4 transmits the GDI response message back to the ISCP 3 over the data link.

The ISCP 3 uses the subscriber's CPR to determine how to process the outgoing call under the present circumstances, in the present case, when there has been no response within the allotted interval. Each subscriber may elect different default routings for this non-response situation. For example, the customer may elect to have such calls routed to a message, e.g. saying that the call can not be completed as dialed. Assume here, however, that the customer has elected to have such calls completed as dialed.

The ISCP 3 therefore responds to the GDI message received in step S37 by generating a call control message for routing the call based on the dialed digits (S38). In step S39, the ISCP 3 transmits the call control message back to the SSP office that initially launched the query. (back in step S33). More specifically, the ISCP 3 includes an address for the SSP central office switching system $1_1$ in the call control message and sends that message over a packet data link to one of the STPs 2. The STP 2 in turn routes the message through the appropriate link to the central office switching system $1_1$. The SSP type central office $1_1$ utilizes information from the TCAP call control message to route the call (S40). In the present example, the central office 1 uses its otherwise normal call routing procedures, of the general types discussed above, to route the call as dialed.

Consider now the DET operations and the user input in more detail. As discussed above, the headend 4 transmits an addressed signaling message through the wireless broadcast from antenna 5 to antenna 6 and set-top terminal or DET 8 (S35). The DET 8 decodes the signaling message and operates in accord with information contained therein. In the present example, the message to the DET instructs the DET to generate a display of call related data from the message (S42). The DET 8 preferably displays the dialed digits of the intended destination telephone number and possibly the fact that the display is with regard to an outgoing call. The DET 8 generates the display on the television 75 in essentially the same manner as described above with regard to the incoming call processing examples.

The display generated in response to the addressed message also includes prompting information requesting a user input specifying a selected disposition of the outgoing call. Typically, the display will prompt the user for a 'yes' or 'no' type answer as to whether or not to complete the call.

Upon viewing the information that the DET 8 displays on the television 75, the user activates the remote control 85 to input desired control information (S43). The DET 8 recognizes the data in the remote control signal as a user input of a type intended for transmission to the headend 4. The DET therefore compiles a signaling message containing the input information. The DET 8 transmits the signaling message back upstream through the channel assigned to upstream signaling information (S44). As part of this transmission, the antenna 6 radiates the message as an RF signal on the appropriate channel, and the antenna 5 supplies that channel to the headend for further processing of the message.

Receipt of the response message from the DET 8 causes an interrupt in the timing loop running in the headend 4. Specifically, the response detection step S41 now produces an affirmative result, and processing by the headend branches to step S45.

At step S45, the headend 4 again formulates a GDI message responsive to the GDI query from the ISCP (see step S34). In step S45, however, the GDI response message includes the user input information received from the DET 8. The headend 4 transmits the GDI response message back to the ISCP 3 over the data link.

The ISCP 3 uses the called subscriber's CPR to determine how to process the outgoing call under the present circumstances, in the present case, in response to a particular input by the user. Each individual subscriber can specify their own customized processing based on their expected input selections, for example to achieve any desired processing of outgoing calls they have screened in real time through the display and user input procedure. In the present example, if the user responded with a 'yes' input indicating a desire to complete the call as dialed, then the ISCP 3 translates that input into an instruction to complete the call. Alternatively, if the user input a negative response, then the ISCP generates an instruction for routing the call to a message or busy signal.

The ISCP 3 responds to the GDI message received in step S45 by generating a call control message for routing the call in accord with the user's input information (S46). In step S39 the ISCP 3 transmits this call control message back to the SSP office that initially launched the query as in the earlier examples, and in step S40 the SSP type central office $1_1$ utilizes information from the TCAP call control message to route the call. If the user operating the remote control 85 at the customer premises elected to allow completion of the outgoing call, then the SSP type central office $1_1$ utilizes information from the TCAP call control message to route the call (S40), using its otherwise normal call routing procedures, of the general types discussed above. However, the call control message may specify other call processing treatments, and the SSP central office $1_1$ will respond accordingly. For example, the user may refuse the call, and the subscriber's CPR may specify routing to an announcement. The call control message will identify the announcement, and the central office $1_1$ will route the call to the identified announcement.

To more fully understand the present invention, it may be helpful to consider the preferred embodiment of the broadband wireless network in more detail.

FIG. 4 provides a high level functional block diagram of the video and data networks used to form the broadband wireless network. As shown, a broadcast headend $10_B$ supplies a number of channels of digital broadcast video information to a plurality of transmitters TX1 to TXN for concurrent broadcasting. An interactive service headend $10_I$ may also provide digital broadband information on one or more channels radiated together with the broadcast channels from the same transmitters and antennae. The two headends 10 may be separate as shown in FIG. 4 or combined into a single system.

The transmitters TX1 to TXN broadcast the broadband channels simultaneously into overlapping portions of a desired service area. A subscriber within the service area will have a directional receiving antenna 38 aimed at one of the transmitters TX1 to TXN. The antenna 38 supplies the broadband channels to a customer premises system 30 for processing. For broadband video signals, for example, the customer premises system 30 processes selected portions of the signals to produce audio/video signals for driving a standard television output device 75.

The system shown in FIG. 4 includes a public wireless packet data network. This data network includes wireless relay transceivers 41, wireline access points (WAPs) 43 and a landline packet data network, shown as a frame relay network 51. The wireless broadcast network and the public wireless packet data network together form the wireless broadband network discussed above relative to FIG. 1. The wireless broadcasts from the transmitters TX1 to TXN provide downstream transport for the broadband information (B); and the wireless packet data network provides two-way data transport for the signaling information (S), including the signaling information exchanged between the set-top terminals and the ISCP 3.

The customer premises system 30 includes one or more set-top terminals and several other components, as discussed in more detail below. The customer premises system 30 is responsive to user inputs from a remote control device 85. These inputs include selection of available broadcast programs. These inputs also include signaling inputs related to interactive services, including the real-time interactive telephone call processing services discussed above. In response to inputs relating to interactive services, the customer premises system 30 will broadcast packet data messages from a second antenna 39. The second antenna 39 typically is a whip or dipole antenna mounted adjacent the directional receiving antenna 38 on a roof-top or chimney of the customer's residence.

The packet data broadcasts utilize a frequency band separate from the frequencies used for the video channels and provide relatively low data rate communications, e.g. 16–56 kbits/s. The transmission from the subscriber's antenna 39 may go directly to a transceiver 45 in a wireline access point (WAP) 43 but typically goes first to one of a plurality of pole mounted wireless transceivers 41. The transceivers and WAPs are located throughout the service area.

The transceiver 41 performs a wireless relay function. Specifically, transceiver 41 receives the message and remodulates the message, onto a different frequency or using a different spread spectrum code, for transmission to another transceiver. In this manner, the message may be retransmitted by one or several transceivers 41 in sequence until it reaches a transceiver 45 which is an element of a wireline access point (WAP) 43.

The WAP 43 provides two-way data connectivity between a number of the transceivers 45 and some form of landline data network. In the example shown, the WAP includes a router 47 connected to the transceivers 45 and a T1 interface to provide a T1 rate connection to a frame relay network 51.

Frame relay is a data service typically offered by the telephone company's for relatively high rate information. Frame relay provides a data transmission technique that combines the high speed and low delay of circuit switching with the port sharing and dynamic band width allocation capabilities of X.25 or other packet switching. Like X.25, frame relay divides transmission band widths into numerous virtual circuits and allows for bursts of data.

In accord with the present invention, the frame relay network provides a virtual circuit data connection to the interactive headend $10_I$. In response to user some inputs received via the packet data network and frame relay network 51, the interactive headend $10_I$ may transmit selected information through one of the broadcast channels.

Alternatively, the interactive headend $10_I$ may transmit interactive service data back to the frame relay network 51. An element or gateway within the interactive headend $10_I$ serves as the interface point between the ISCP 3 and the set-top terminals in the customer premises systems 30. The gateway transmits signaling data messages, including any from the ISCP 3, back to the frame relay network 51. The frame relay network in turn supplies each message to the WAP 43 for broadcast from the transceiver 45. The transceiver 45 addresses the message to the pole top transceiver 41 servicing the particular customer premises system 30, and that transceiver retransmits the message to the subscriber's antenna 39. The subscriber's antenna 39 supplies the relevant RF spectrum signals, including the message, to the customer premises system 30 for further processing.

One or more elements within the customer premises system 30 recognizes an address in the received data message, and processes the data contained in the message. The message information may control operation of a set-top terminal device, e.g. to permit decryption of a pay-per-view program. Alternatively, the message data may relate to interactive data for display on the associated television set 75. For example, the data may produce a display of character information such as sports scores, overlaid on the displayed video information. The data may also produce displays of overlaid icons facilitating further inputs relevant to the interactive service. In accord with the present invention, at least some of the signaling data messages sent to the customer premises system 30 come from the ISCP 3 and provide display information and/or terminal control instructions relating to processing of telephone calls.

The two-way signaling via the packet data communication facilitates interactive services requiring relatively low down-stream data rates. For example, this signaling could provide price information and ordering instructions for overlay on a home shopping channel, as well as a receipt type display after a user orders a product. This signaling may also permit a user to play along with a game show on one of the broadcast programs or to order selected sports scores for scrolling text display on the TV 75. The upstream signaling may also control transmission of information on one of the broadband channels.

The packet data communication elements of the system of FIG. 4 are not dedicated to the interactive service. The wireless data components 41, 43 and the frame relay network 51 will support a wide range of wireless data communications from other types of data services. For example, a laptop PC 57 would have a wireless RF modem 55 connected thereto through a standard serial data interface, such as RS232. The RF modem 55 conducts packet data communications through the pole top transceivers 41, the WAP 51 and the frame relay network 51 in essentially the same manner as for the interactive services discussed above.

Peak data usage, typically by business customers, occur in the daytime. In contrast, peak interactive video usage by residential customers occurs at night. The wireless transport for data to and from data devices, such as PC 57, may be billed as a flat rate monthly charge plus either a fixed per call charge or a time and distance charge per call charge. Typically, broadband customers pay a monthly service charge for interactivity plus a per call charge for the duration of each interactive session. Both the data charges and the interactive service charges support installation and operation of the packet data network.

If appropriate, the PC 57 and RF modem 55 may conduct a session with the interactive headend $10_I$ for example to order delivery of a particular message or piece of video information from that headend to a particular customer premises system 30. While engaged in such a session, the PC 57 may serve as the terminal 8 to provide call related displays in response to signaling messages from the ISCP 3 and/or supply user input call control signals to the ISCP. A user of the PC 57 and modem 55 also might utilize the packet data transmissions to access other data services, such as the exemplary host computer 59 or the INTERNET interface 61 shown in FIG. 4. The wireless data network will also carry data communications from the PC 57 and RF modem 55 to other similar devices (not shown) or to the set-top terminals for display on the television 75.

In the presently preferred embodiment, the wireless packet data communication network utilizes components (modems, transceivers, WAPs) marketed by Metricom (Los Gatos, Calif.) as part of the Ricochet wireless network. The RF modems 55 and RF modems included in the customer premises equipment (see 212 in FIG. 9) utilize frequency hopping type spread spectrum communications in the 902–928 Mhz frequency band. The pole top transceivers 41 and the WAPs 43 are typically operated by a local carrier who markets the data service, e.g. the local exchange telephone carrier.

The frame relay network 51 is a service currently available from many local exchange carriers. Although not shown, the frame relay network 51 connects to and will continue to provide data service to a large number of landline data devices.

A more detailed description of the broadband signal transport in accord with the preferred embodiment follows.

In the preferred embodiment of the present invention, groups of broadband program signals are digitally encoded and compressed, and the compressed program streams are time division multiplexed into digital transport streams. Each digital transport stream is modulated and/or upconverted into one RF channel, in the preferred embodiment a channel in the high end of the ultra high frequency (UHF) microwave range (e.g. 2.1 to 2.7 Ghz) currently used for MMDS and ITFS type wireless cable services, although other frequency channels could be used. Separately located transmitters simultaneously broadcast a UHF frequency signal containing all of the channels. The transmitter antennae are located and the transmitter emission patterns are designed so that the waves from the transmitters propagate throughout substantially overlapping portions of the service area.

The overlapping portions may extend throughout the intended reception area. Existing regulations relating to the relevant frequency allocations specify a primary service area and a secondary service area. Within the primary service area, the regulations protect the licensee from any interference on the relevant frequency channel. In initial implementations of the preferred embodiment of the present invention complying with such regulations, the overlapping areas of propagation from the multiple transmitters would cover at least a major portion of the primary reception area and preferably also cover a substantial portion of the secondary reception area. Some portions of the secondary reception area may be covered by propagating waves from only one of the transmitters. All of the primary and secondary areas would be covered by propagating waves from at least one of the transmitters.

Figure 5A:
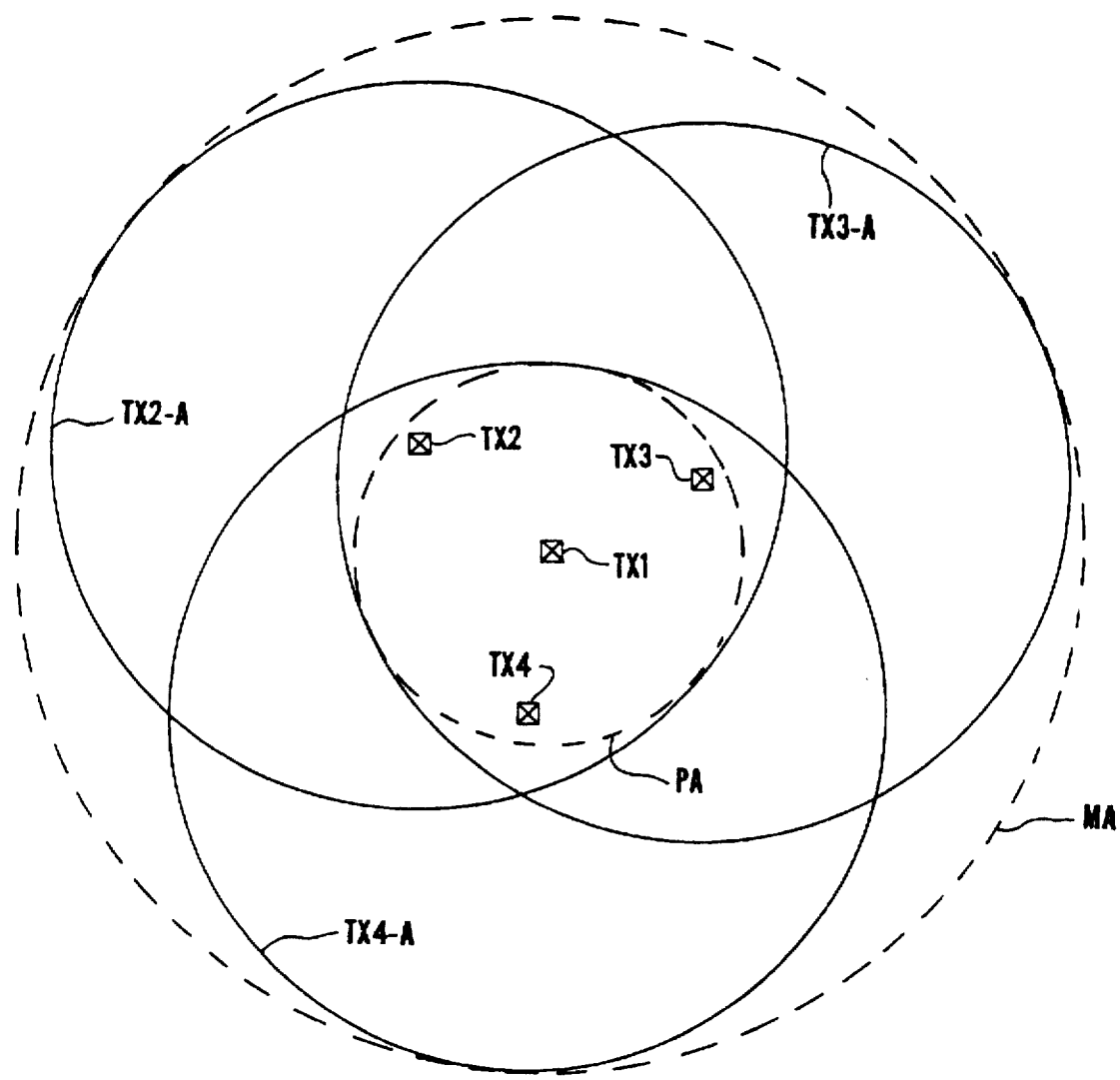
FIGS. 5A and 5B depict exemplary propagation areas for simulcast transmissions into a receiving area, for the broadband downstream transmissions in the network of FIG. 4.

Referring to FIG. 5A, the circle PA defines the Protected Area or primary area which may be serviced from a transmitting antenna TX1. At the present the radius of this circle is 15 miles. However, usable signal and acceptable reception generally occurs to a radius of 40 miles which is here defined by the circle MA indicating the Maximum Area. The region between the 15 mile radius and the 40 mile radius forms a 'secondary' service area. All or part of the rights of existing educational ITFS (Instructional Television Fixed Service) type institutional service users are leased. Also, licenses are aggregated, from companies currently licensed to use MMDS (Multi-channel Multipoint Distribution Service) channels. Existing analog services (both ITFS and MMDS) are replaced by the new service which will provide the original programming desired by the ITFS institution in addition to a multiplicity of programs made possible by the system and method of the invention. In order to achieve this end, simulcasting is utilized in a unique manner.

Referring to FIG. 5A there is shown one preferred embodiment of a simulcast arrangement utilizing the original antenna TX1 in addition to antennas TX2, TX3 and TX4 disposed in a generally triangular configuration within or on the boundary of the Protected Area (PA). According to this embodiment of the invention, all antennas radiate in an omni-directional pattern in azimuth as indicated by the circles TX2-A, TX3-A and TX4-A. The central antenna TX1 radiates out at a somewhat higher power to the maximum area MA, in a manner permitted by existing regulations, as discussed above relative to FIG. 1A. A major portion of the protected area (PA) is overlapped by the signals from all antennas TX, TX2, TX3 and TX4. In the Maximum Area (MA) considerable overlap continues to exist but to a lesser extent. In this manner it has been found possible to reach receivers in approximately 90–95% of the maximum area (MA).

Figure 5B:
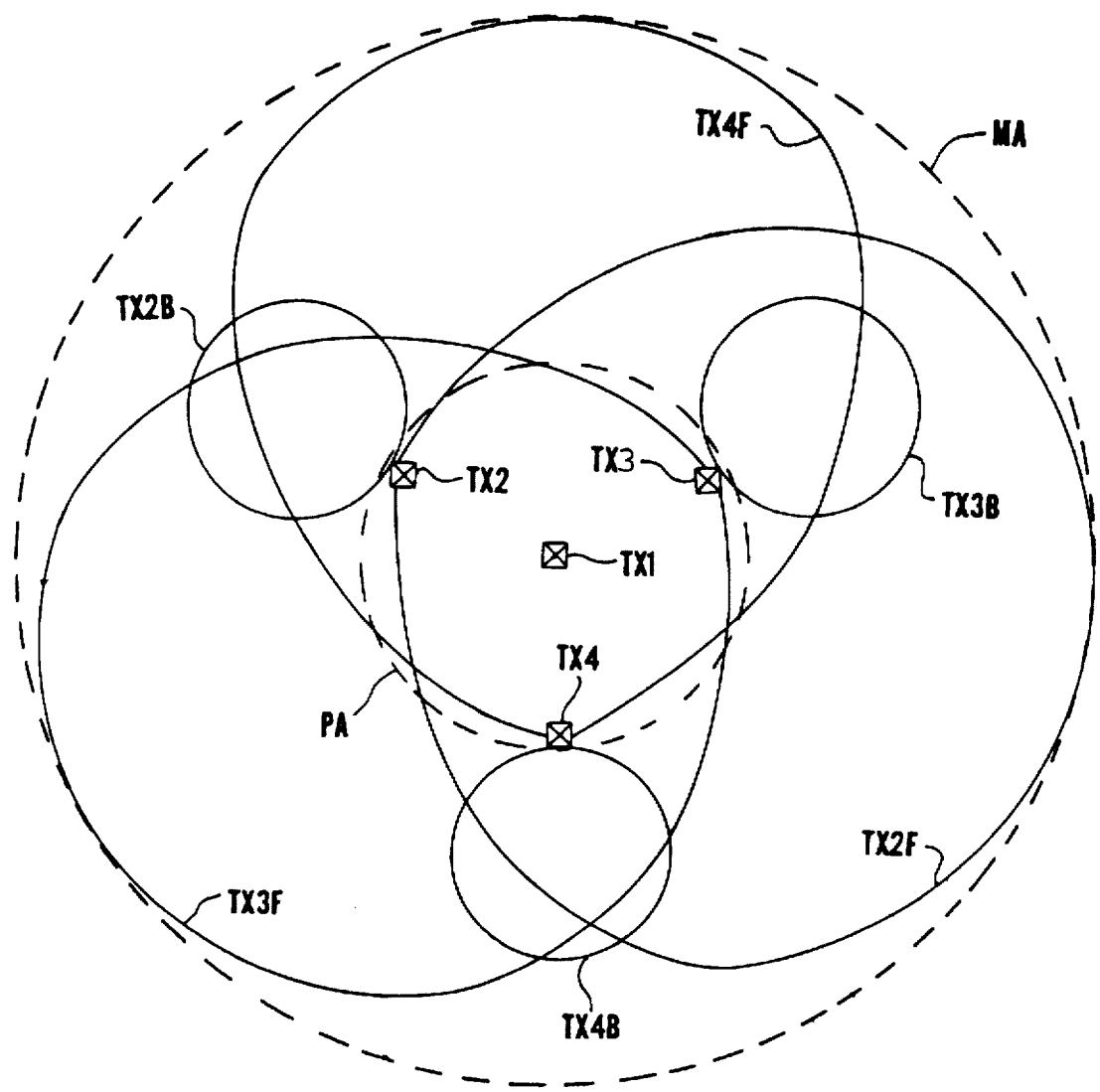

Referring to FIG. 5B there is shown a second preferred embodiment of simulcasting utilizing directional antennas TX2, TX3 and TX4. In this embodiment the central antenna TX1 retains its omni-directional pattern. However, the antennas TX2, TX3 and TX4 are provided as directional antennas radiating forward and backward lobes TX2F and TX2B for antenna TX2, TX3F and TX3B for the TX3 antenna and TX4F and TX4B for the TX4 antenna. In both the embodiments of FIGS. 5A and 5B it will be seen that there is a radical departure from the minimum overlap approach which is conventional in the systems illustrated in FIGS. 2 and 3.

In a typical installation, the broadband transmitters TX1 to TX4 all broadcast the same program signals at approximately the same time. The broadcasts from two or more of the transmitters may actually be simultaneous and in-phase with each other. Others of the broadband transmitters may broadcast the same signal but with predetermined time offsets between the actual radiations from the respective transmitter antennae. Such timing relationships between the broadcasts from the multiple transmitters are discussed in more detail in U.S. patent application Ser. No. 08/441,976 filed May 16, 1995 entitled "SIMULCASTING DIGITAL VIDEO PROGRAMS" (attorney docket no. 680-130C), the disclosure of which is incorporated herein in its entirety by reference. In the presently preferred embodiment, the same signal for each channel is broadcast from all of the transmitter antennae synchronously, i.e. with all emissions for each channel being in-phase with each other.

Figure 6A:
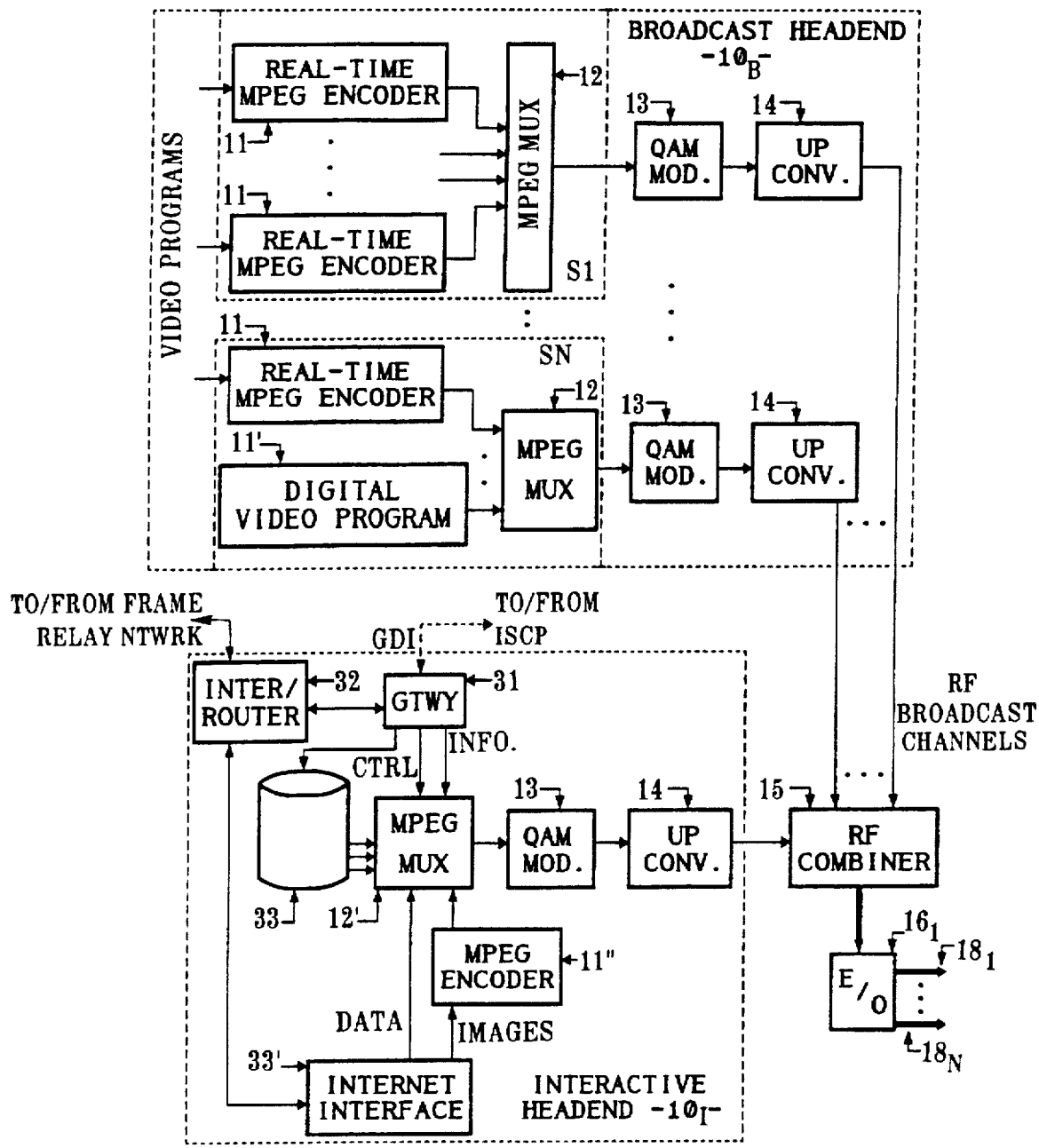
FIGS. 6A and 6B together depict in functional block diagram form the elements of the broadband transmission system of FIG. 4. In this regard.

With reference to FIG. 6A, the broadcasting portion of the system includes a broadcast headend $10_B$. The broadcast headend $10_B$ includes a number of Sources S1 to SN for producing digital transport streams, each of which contains a plurality of programs encoded as digital, compressed data. The number of such sources corresponds to the number of frequency channels available for broadcast service use in a particular geographic region. Typically, the FCC licenses up to 33 channels of MMDS and ITFS services in a given area. It may be possible to aggregate rights to use all such channels, but to provide a commercially viable service, typically only 20–25 such channels are necessary. As discussed below, in the preferred embodiment, one RF channel is reserved for broadband interactive services. The broadcast headend $10_B$ therefore typically comprises 19–24 of the Sources S1 to SN, but may include as many as 33 such sources.

The Sources S1 to SN may convert analog program information from video sources, (e.g. off-the-air feeds, satellite receivers, VCRs, etc.) into compressed, digital data form. The headend $10_B$ may also receive and process previously encoded material.

The video information, accompanying audio information and certain related data (if any) are encoded using a standardized digitization and compression technique, such as MPEG (moving pictures expert group) or DIGICIPHER™. The preferred embodiment utilizes MPEG II encoding.

FIG. 6A illustrates the overall architecture of the broadcasting system. As part of the headend $10_B$, that figure provides a simplified diagram of the source encoder functionality, e.g. at S1, for preparing a group of original analog source signals for transport through the network. As shown, each analog television signal, e.g. in NTSC format, is applied to an MPEG encoder 11. The encoder 11 digitizes both audio and video for a program, and packetizes the compressed digital data in accord with the appropriate standard. The encoder may also encrypt the data before insertion thereof into the transport packets.

MPEG is a bi-directional predictive coding compression system, utilizing discrete cosine transformation (DCT) processing. Picture elements are converted from spacial information into frequency domain information. Compression begins by discarding information to which eyes are insensitive. From the remaining information, the encoder will develop reference (I) frames, predictive (P) frames and delta (B) frames.

The number of frames to be coded for each I frame is set in the standardized MPEG syntax, e.g. one reference frame for each group of fifteen frames, or every half second. A prediction is made of the composition of a video frame, termed a P frame, to be located a specific number of frames forward and before the next reference frame, this specific number also is set in the MPEG syntax. Information from previous video frames as well as later video frames is used in formulating the prediction. "Delta" or "B" frame information is developed for coding the video frames between the actual and predicted frames, also by looking at frames in both directions. Rather than updating a whole frame, only the changed (or delta) information is provided for the delta video frames. Thus the total information coded, and then transmitted, is considerably less than that required to supply the actual information in the total number of frames. Typically, between I frames, the frame sequence consists of a repetitive succession of two B frames followed by one P frame.

The MPEG II standard provides a standardized format for packetizing the compressed audio and video information and for transporting other data. Under the MPEG II standard, incoming individual video signals and related audio signals are encoded and packetized into respective Video and Audio Packetized Elementary Streams (PES). The video and audio PES's from one or more sources of video programming may be combined into a super transport stream for transmission or storage.

Each frame of compressed program information (audio, video or data) is broken down into a series of transport packets. Although the frames can vary in length, e.g. between a full reference I-frame and a delta B-frame, the transport packets have a fixed 188 byte size. Thus, different frames are broken down into different numbers of MPEG transport packets. For example, in a 6 Mbits/s encoding system, a group of frames consisting of a total of 15 frames for one-half second of video (one I frame and a number of P and B frames), breaks down into approximately 2000 transport packets (or 4000 packets per second).

Each 188 byte transport stream packet consists of at least two sections, a 4 byte packet header section and either one or both of an optional adaptation field of variable length and/or a payload section. The header information includes, inter alia, a synchronization byte, a variety of different flags used in reconstruction of the frames, and a thirteen bit program identification (PID) number. PID value 0 is reserved as an indication that the packet includes program association table data. PID value 1 is reserved for identification of packets containing conditional access data, such as encryption information. Other program identification numbers are utilized to identify transport packets with the program or source from which they originate.

On decompression, the decoder in sequence reconstructs the frames for a particular program from packets bearing the appropriate PID value, uses the reference frame to form the prediction frames, and then uses the prediction frames and delta information to construct full frames from the delta frames.

The MPEG II standard facilitates time division multiplexing of MPEG packet from a plurality of programs. In the present system, the encoders 11 supply MPEG packet streams for multiple programs to an MPEG multiplexer 12. The number of programs may vary depending on the bandwidth. The MPEG multiplexer 12 may receive digitized and compressed (MPEG) video from other digital sources 11'. Typical digital sources 11' include digital server (storage) systems and digital video transmission systems (e.g. satellite or optical fiber). As discussed below, a typical multiplexed digital transport packet stream used in the present invention has 27 Mbits/s of payload capacity. A mixture of program streams for individual programs at different individual rates, e.g. 1.5 Mbits/s, 3 Mbits/s and 6 Mbits/s, are combined to fully utilize the 27 Mbits/s capacity. In one example, the 27 Mbits/s multiplexed digital transport packet stream might consist of three 3 Mbits/s programs and three 6 Mbits/s programs. For simplicity of further discussion, however, assume encoding of programs at a 6 Mbits/s rate, therefore the multiplexer 12 combines four MPEG II packet streams of four such programs for output on each broadband rail.

The simplified example therefore provides four programs for one RF channel, i.e. a 4 to 1 improvement over the existing single analog program channel. The other mix of three 6 Mbits/s programs and three 3 Mbits/s programs provides six programs for one RF channel, i.e. a 6 to 1 improvement. Lower bit rates and/or more efficient modulation techniques can further extend the program capacity provided through each RF channel.

In a typical example, there are at least three PID values for packets of a particular television type program encoded in MPEG II form, a first PID value for packets containing video, a second PID value for packets containing audio and another PID value for a packet containing a program map. There often are more than three PID's associated with the packets containing programming from one source. For example, there could be a data channel associated with the program which would include data for closed captioning for the hearing impaired and/or related control signaling information. There could be a number of audio elementary streams, for example, carrying respective different languages. The program map, in turn, specifies the PID values for the various packets containing video, audio and/or data from the particular source.

In an MPEG super packet stream carrying packets for two or more programs, the PID values for each program will be unique, and each such program is assigned a unique program number (PN). For example, HBO might have a program number '1', and the program map for HBO might be found in packets corresponding to PID 132. Showtime might have a program number of '2', and the program map for Showtime might be found in packets identified by PID 87 and so forth. The program map for HBO in the packet with PID 132 would then identify the PID numbers for the actual packetized elementary streams (PES) for the video, audio and data (if any) channels associated with the HBO program. The program map for Showtime in the packet with PID 87 would then identify the PID numbers for the actual packetized elementary streams (PES) for the video, audio and data (if any) channels associated with the Showtime program.

In the present embodiment, each multiplexer 12 outputs a group of MPEG encoded programs, i.e. four if the encoding rate of all encoders 11 is 6 Mbits/s, at a combined payload rate of 27 Mbits/s (it may be necessary to pad the stream with dummy packets to reach the full 27 Mbits/s). The actual stream will include an additional 3 Mbits/s of forward error correction information for a combined rate of 30 Mbits/s, although hereinafter for convenience the bit stream is generally described by its 27 Mbits/s payload rate.

The MPEG II standard also requires that a packet stream containing packets relating to one or more programs includes a program association table in a packet identified by PID 0. The program association table maps each program number with the PID value associated with the program map related to that source. In accord with the standard, each MPEG II multiplexer 12 combines MPEG packet streams for the four (or more) input programs and adds a PID 0 packet containing the program association table to the combined stream. In the above example, the program association table would map program number '1'(HBO) with PID value 132 indicating that the program map for HBO is contained in repeating packets identified by PID 132. Similarly, the program association table would map program number '2' (Showtime) with PID value 87 indicating that the program map for Showtime is contained in repeating packets identified by PID 87.

Reception of a particular digital program requires that the CPE terminal device know the RF channel transporting the program and the program number (PN) associated with the program. The decoder uses the information contained in the PID 0 packet to identify the PID value for the program map for the particular desired program, e.g. 132 in the above HBO example, and uses the program map to identify the PID values needed to capture the video, audio and user data (if any) for the desired program.

The 27 Mbits/s payload (actually 30 Mbits/s including forward error correction bits) baseband digital output of each MPEG multiplexer 12 from one of the sources S1 to SN goes to a modulator 13. A variety of modulators may be used. U.S. Pat. No. 5,231,494 to Wachob, the disclosure of which is incorporated herein in its entirety by reference, teaches quadrature phase shift keyed (QPSK) modulation of a plurality of video, audio and data signals into a single data stream within a standard six Mhz channel allocation for transmission over a cable television type distribution network. The currently preferred implementation uses 64 QAM (quadrature amplitude modulation) or VSB (vestigial sideband) modulation techniques in the modulators 13. Using 64 QAM, 4 channels of 6 Mbits/s or a mix of 1.5, 3 and 6 Mbits/s encoded digital video information up to a total of 27 Mbits/s together with 3 Mbits/s of forward error correction information can be modulated into one 6 Mhz bandwidth analog channel. Higher or lower rates of forward error correction may be used, and a specific forward error correction technique is selected to provide optimum transport through the wireless broadband medium. The choice of the forward error correction bit rate will result in an inverse modification in the maximum payload rate. Also, 256 QAM or 16 VSB would yield up to 40 Mbits/s of payload capacity (not counting bits added for forward error correction), e.g. for 6 channels of 6 Mbits/s or mixes of the various rate encoded digital video information modulated into one 6 Mhz bandwidth analog channel. Each modulator 13 produces a 6 Mhz bandwidth output at an intermediate carrier frequency.

Each modulator 13 outputs the intermediate frequency signal to an individual upconverter 14. The upconverter 14 converts the frequency of the QAM modulated signal up to one of up to thirty-three RF channel frequencies in the 50–450 Mhz range. The upconverter 14 may be an element of the QAM modulator 13 or a separate element as shown hard wired to process the output of the QAM modulator. Each upconverter 14 outputs a different 6 MHz bandwidth RF channel to an RF combiner 15 for combining with the other 6MHz RF signals from the other upconverters 14. The RF combiner 15 thereafter outputs the combined RF signals in the normal video channel range of approximately 50–450 Mhz. The upconverters 14 and the RF combiner 15 may be the same as components currently used for RF signal processing in cable television systems.

FIG. 6A also illustrates the structure of an exemplary interactive service headend $10_I$. As shown, the interactive service headend $10_I$ includes a server 33. The server 33 stores a variety of video information in MPEG II encoded form. Although theoretically, the server could store and transmit full motion movies or other videos on demand, as a practical matter, there are too few RF channels available to make such bandwidth intensive interactive services available through the wireless network here under consideration. In the presently preferred embodiment, the video information stored in server 33 for most interactive services consists of less than the amount of information needed for a full motion video type presentation of more than a few seconds.

In the preferred embodiment discussed in more detail in the above incorporated U.S. Pat No. 08/491,515 application (attorney docket no. 680-130D), the information from server 33 for a particular service typically consists of a sequence of still frames, a series of frames providing a limited form of motion or a short full motion sequence of only a few seconds. The server will also store accompanying audio.

The server outputs MPEG II bit streams for the interactive broadband information to an MPEG multiplexer 12'. The multiplexer 12' is similar in structure and operation to the multiplexers 12 discussed above, except that the multiplexer 12' receives data and/or images in bit stream form (rather than packets) and packetizes and multiplexes the data and/or images under real time by a gateway 31. Although not separately shown, the MPEG multiplexer 12' includes an MPEG II compliant packet assembler. The multiplexer 12' packetizes the image and data input thereto and multiplexes the resultant packets into a 27 Mbits/s (actually 30 Mbits/s including forward error correction bits) MPEG II super transport stream. The transport stream output by multiplexer 12' meets the same specifications and standards requirements as the stream output by each of the multiplexers 12. The information within the stream, however, relates to interactive services and utilizes a larger number of PID values to identify content relating to a larger number of programs.

An interface and router 32 connects the headend $10_I$ to the frame relay network shown in FIG. 4. The interface and router 32 may consist of a T1 interface and frame relay router similar to the interface 49 and router 47 used in the WAP 43 (FIG. 4). The interface and router 32 provides two-way transport of data through the frame relay network and wireless packet data links, as discussed above. Upstream signaling messages from the DETs go from the interface and router 32 to the gateway 31. The upstream signals may relate to selections of individual interactive services or selections or other interactive inputs relating to many selected services.

The gateway 31 connects through a packet switched link or other data link to the ISCP, for two-way GDI protocol signaling communications of the type discussed above. The gateway 31 serves as the interface point in the headend $10_I$ for communications between the ISCP and the interactive service DETs. Accordingly, at least some signaling data sent from the gateway 31 through the interface and router 32 relates to telephone calls. At least some upstream data supplied to the gateway 31 relates to user input information regarding real-time control of processing of calls to and/or from integrated service type subscriber premises.

The gateway 31 is a computer which controls operation of the interactive headend system in response to subscriber inputs and software programming stored in the gateway computer. For example, in response to a particular user input received via the interface and router 32, the gateway 31 might instruct server 33 to retrieve a particular MPEG encoded image and output that image on a particular port. The gateway 31 would also instruct the MPEG multiplexer 12' to packetize the image on the assigned port and insert a specific PID value in each of the packets. The gateway transmits a message back to the terminal in the customer premises system providing information necessary to capture and process the packets containing the image information, at least including the assigned PID number. The message from the gateway 31 goes back through interface and router 32, the frame relay network and the wireless packet data communications to the customer premises system, as discussed above relative to FIG. 4.

The gateway 31 may transmit other relatively low speed data back to the customer premises system through the frame relay and wireless packet data communication link, including the data from the ISCP relating to telephone call processing. This data also may relate to text or graphics overlays or software instructions needed to execute certain functions required by particular interactive services. Alternatively, for similar data requiring higher rate throughput, the gateway 31 may provide the information to the MPEG multiplexer 12'. The multiplexer 12' will encapsulate the information as MPEG transport stream packets in the usual manner but will identify the payload as user data.

The interactive headend may also provide access to other networks offering interactive services. In the illustrated example, the headend $10_I$ includes an INTERNET interface 33'. The interface 33' provides a standard connection to the INTERNET. For relatively low speed services, the customer premises system may access this interface 33' through the wireless packet data communications, the frame relay network and the interface and router 32. If as a result of a session through the interface 33', the user selects information requiring broadband transport, the interface 33' will supply that information to the MPEG multiplexer 12' for processing.

If the broadband information from the interface 33' is data, the multiplexer 12' will packetize that data and insert the assigned PID value, in a manner similar to that for data from the gateway 31. If the broadband information from the interface 33' comprises bit mapped images, the interface 33' supplies the information to an encoder 11". The encoder 11" encodes the bit mapped images as MPEG II standard I frames (reference frames) and supplies those frames to the MPEG multiplexer 12'. The MPEG multiplexer 12' packetizes the I frame images and multiplexes the resultant packets into the super transport stream in the same manner as for images from the server 33.

The 27 Mbits/s payload (actually 30 Mbits/s including forward error correction bits) baseband digital output of the MPEG multiplexer 12' goes to another QAM modulator 13 identical to those discussed above. This additional modulator 13 outputs the intermediate frequency signal containing the interactive service information to another one of the upconverters 14. This additional upconverter converts the frequency of the QAM modulated signal up to one of the 6 MHz wide RF channel frequencies in the 50–450 Mhz range which has been assigned to the broadband interactive services. The upconverter 14 in the headend $10_I$ outputs the assigned 6 MHz bandwidth RF channel to the RF combiner 15 for combining with the other 6 MHz RF signals for the broadcast services. The output of the RF combiner in the 50–450 Mhz range therefore includes both the broadcast services and the RF channel carrying the broadband information relating to the interactive services.

A transmission network supplies the combined spectrum signal in the UHF range from the combiner 15 to a number of transmitter systems $17_1$ to $17_N$. The transmitter systems $17_1$ to $17_N$ correspond to the transmitters TX1 to TX4 described above with respect to FIGS. 5A and 5B. Although coaxial cable, wireless microwave relay transmissions or other media could be used, in the preferred embodiment, the transmissions from the headend $10_B$ ride on optical fiber lines $18_1$ to $18_N$. In the preferred embodiment, an electrical to optical converter system 16 converts the signal from combiner 15 into the necessary number of optical signals for transmission over a plurality of optical fibers $18_1$ to $18_N$. An optical to electrical unit 20 (FIG. 6B) at each transmitter site converts the optical signal back to the combined electrical signal and supplies that signal to one of the transmitter systems.

One feature of the present invention relates to the precise timing of the simulcasting, i.e. simultaneous or concurrent broadcasting with specified time delays or offsets between various transmissions, of the combined spectrum UHF signal from all of the transmitter antennas TX1 to TXN. The optical fiber signal transmission from the headends 5 and 10 to the transmitter systems requires some finite amount of time. Typically, the transmitter systems will not be equidistant from the headend. In fact, one of the transmitter systems (e.g., the primary transmitter) may be in the same building as the broadcast headend $10_B$. To insure broadcasting with the desired time relationships discussed above, the system shown in FIGS. 6A and 6B therefore includes some form of delay 19 in one or more of the transport lines 18. The delay(s) may take the form of coils of fiber in the optical transport paths so that differences in the time through each path produce the desired delays in transmission. Alternatively, one or more electronic delay devices may be imposed in the relevant paths, either at the headends prior to optical transport or at the respective transmitter location subsequent to conversion back to electrical signal form.

There may be as few as two transmitters. In a typical example, there will be a central transmitter site TX1 and two or three other transmitter sites TX2, TX3 and TX4 at various locations about the primary reception area (see e.g. FIGS. 5A and 5B). One or both of the headends may be close to the central transmitter site TX1, therefore the transport distance to that site would be the shortest. Assume now, for example, that TX4 is the longest distance from the headend and is 15 miles from the central transmitter TX1. The delay produced by delay device 19 preferably equals the difference in the time required to transport optical signals from the headend to those two sites. If broadcasting with time offsets is desired, delay device 19 would impose an additional delay to compensate for the difference in wireless RF propagation time from the corresponding antennae to any commonly aligned receiving antennae. In such a case, the delay results in a time off-set transmission of the exact same signal from the antennae at the two transmitters TX1 and TX4 of the type discussed in detail in the above incorporated application Ser. No. 08/441,976 (attorney docket no. 680-130C). Similar delays (not shown) may be imposed in the lines 18 to the other transmitter systems as necessary.

Figure 6B:
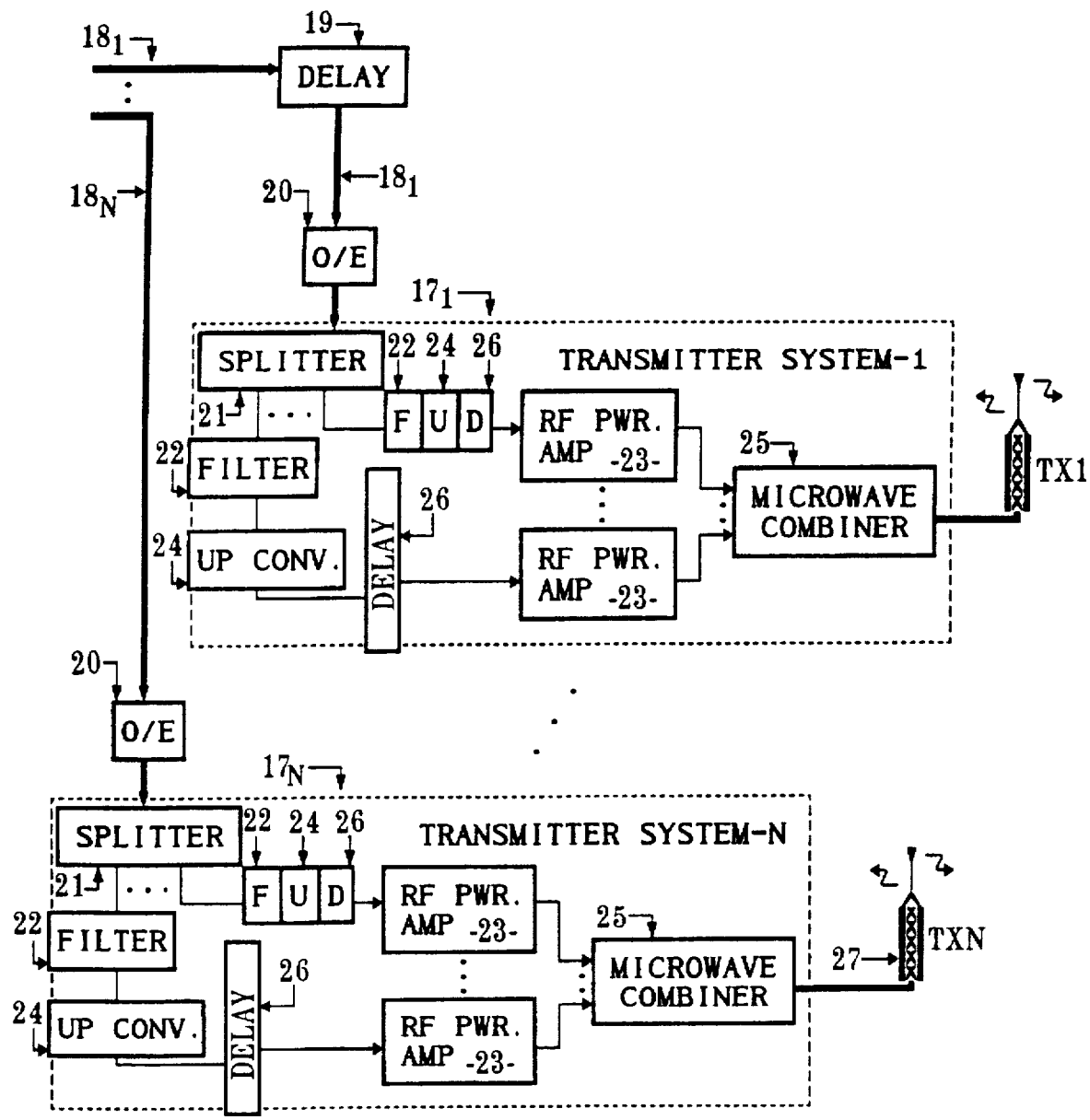

FIG. 6B also shows details of the transmitter systems 17, by way of an example. Each transmitter system includes a splitter 21. The splitter 21 together with associated channel selection filters 22 divide the received combined signal (50–450 Mhz) into its constituent 6 Mhz wide RF channels. For each 6 MHz channel in the 50–450 Mhz range, one of the upconverters 24 converts that channel into one of the up to thirty-three available (licensed) channels in the UHF microwave range. An RF power amplifier 23 amplifies each UHF channel.

A delay device may process each channel signal, and by way of example, FIG. 6B shows a delay device 26 processing the output of each of the upconverters 24. The delay devices 26 provide precise delay compensation on each respective channel to compensate between variations in throughput processing time of the various components at different transmitter sites operating on the signal to be broadcast on a particular microwave channel, to thereby achieve the precise timing relationships for each individual microwave channel signal.

A microwave combiner 25 combines the UHF channel signals back into a combined spectrum signal in the UHF range and supplies that signal to a microwave broadcasting antenna 27. Each transmitting antenna may be an omnidirectional antenna or a directional antenna depending on whether the transmitter serves as a primary transmitter or a secondary transmitter. The antenna 27 emits UHF waves to propagate through a portion of the service area. The transmitted microwave signals propagate into substantially overlapping portions of the service area and into some non-overlapping portions of that area, for example in patterns such as shown in FIG. 5A.

The above discussion of the headend and transmission systems is one example of an overall system for providing the substantially simultaneous broadcasts from multiple transmitters having substantially overlapping propagation areas. Other headend and transmitter systems could be used. For example, the headends 5 and 10 could perform the digital multiplexing, and the transport network to the transmitters TX1 to TXN could carry the multiplexed transport streams in digital form. In such a case, the individual transmitter systems would further include at least the QAM modulators for each RF channel. In such a system, the transmitters may include means to digitally delay broadcast transmissions a predetermined amount with respect to some common clock, e.g. from a geo-positioning type satellite system, to achieve the desired time-offset transmissions.

Figure 7:
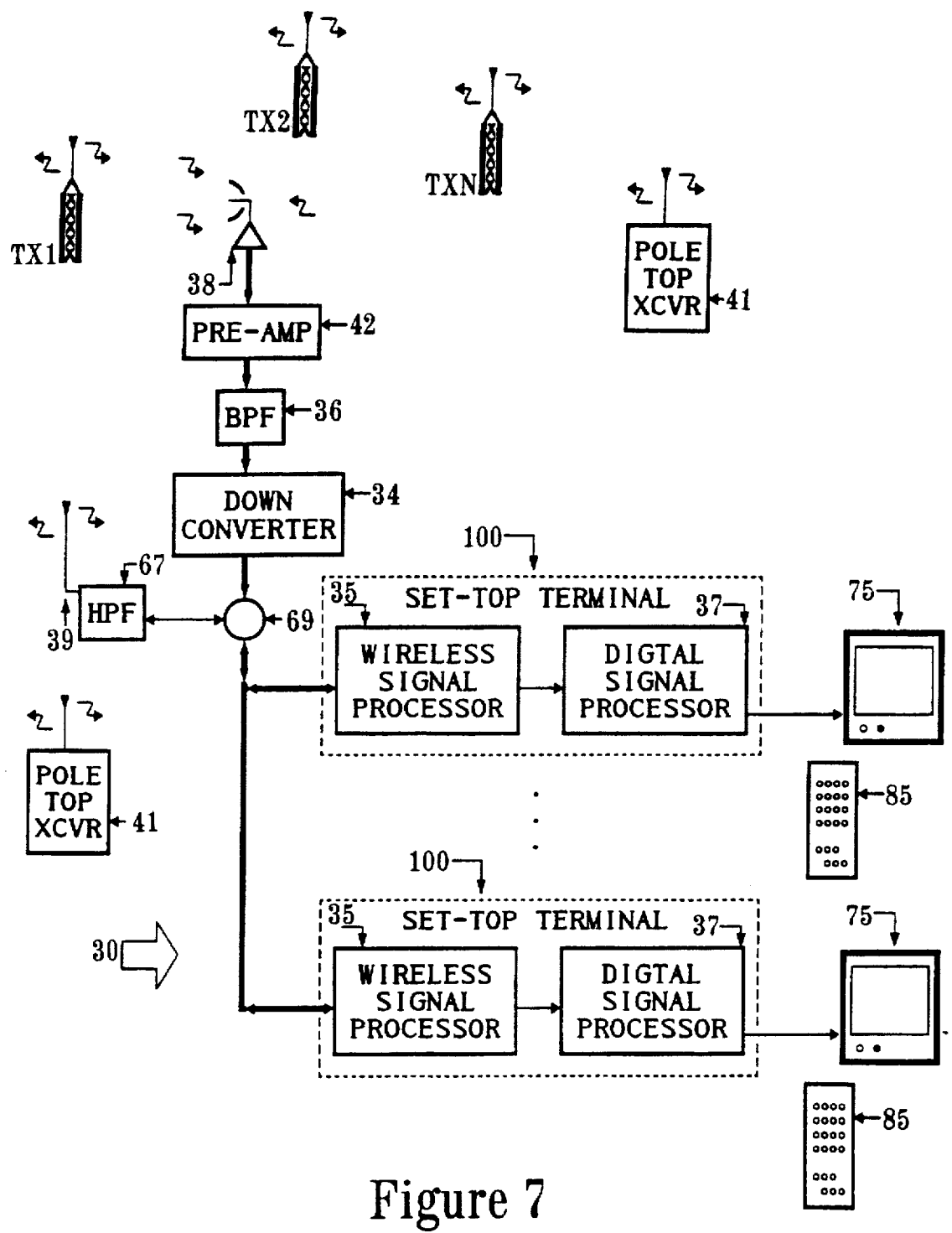
FIG. 7 illustrates the functional elements of a customer premises system used in the combined system of FIG. 4.

FIG. 7 provides a high-level functional diagram of a customer premises receiving system at one subscriber's premises as well as several of the wireless system components communication with the customer premises system. Each subscriber has a broadband service receiving antenna 38. In accord with the preferred embodiment, the receiving antenna 38 is a directional antenna. Typically, the receiving antenna comprises an elliptical dish shaped antenna 18–36 inches long, formed of parallel curved elements. In the preferred embodiment, this antenna has a horizontal field of view (defined by 3 db drop off in signal strength at the boundaries) of approximately 12 degrees. The receiving antenna may have a front-to-back rejection ratio of 30 db or more.

At most potential receiving sites, it will be possible to aim the antenna 38 toward a single one of the transmitters and receive line-of-sight transmissions therefrom. Transmissions from one transmitter, e.g. TX2, may be blocked by an obstruction (not shown), but at many receiving sites line-of-sight transmissions from at least one of the other transmitters, such as TX1, is more likely to be unobstructed.

At installation, the directional antenna 38 is aimed at the one or more of the transmitters TX1 to TXN which produces the strongest received signal through the antenna at the subscriber's particular location. Even so, the antenna receives multiple copies or replicas of the transmitted waveform signals. These multiple copies include a primary direct line-of-sight transmission of a signal from the transmitter the antenna is directed towards together with delayed copies (typically attenuated and distorted) caused by multi-path reflections of the transmissions from one or more of the multiple broadcast sites. Also, at locations where two transmitters fall within the field of view of the receiving antenna 38, the antenna 38 would receive a first copy of the combined spectrum transmission from the closest transmitter as well as a second copy transmitted from the more distant of the two aligned transmitters.

The present invention therefore contemplates inclusion of some form of delay processing in the receiver to compensate for the reception of multiple delayed copies of the transmitted program signals. The presently preferred embodiment discussed below utilizes a delay equalizer. As an alternative, the processing circuitry could utilize spread spectrum technology, as discussed in more detail in commonly assigned U.S. patent application Ser. No. 08/405,685, filed Mar. 17, 1995 (attorney docket no. 680-117) entitled "Television Distribution System and Method." The two copies of the signal arrive with a time difference within the processing window of the particular delay processing device. The spread spectrum implementation also reduces the need for direct line-of-sight reception.

The receiving antenna 38 supplies the 2.1 to 2.7 GHz spectrum (through appropriate filtering not shown) through a preamplifier 12 and a bandpass filter 36 to a block down-converter 34. The block down-converter converts the 2.1 to 2.7 GHz signal, containing all of the RF channels, back down to the video channel band of 50–450 MHz. The block down-converter supplies the 50–450 MHz combined spectrum signal through a splitter/combiner 69 and a coaxial cable to one or more terminal devices 100 located at various places in the subscriber's home. The coaxial cable carries downstream only signals in the 50–450 MHz range. The coaxial cable also carries two-way packet data messages in a predetermined higher frequency range, e.g. 902–928 MHz.

The splitter/combiner 69 and an associated two-way highpass filter 67 permit two-way transmission of signals between the coaxial cable and the second antenna 39. In the preferred embodiment, the data signals utilize the 902–928 MHz frequency band, therefore the filter 67 passes signals above approximately 900 MHz. However, the splitter/combiner 69 and filter 67 block lower frequency signals, e.g. 50–450 MHz signals from the downconverter 34, from passing to the antenna 39. The splitter/combiner 69 blocks passage of signals back upstream toward converter 34 and broadband receiving antenna 38.

Each set-top terminal 100 includes some form of wireless signal processor 35 for processing a selected one of the 6 MHz channels to recover the digitally multiplexed transport stream carried in that channel. The wireless signal processor 35 also includes data packet processing circuitry for sending and receiving data over the frequency range assigned to the wireless packet data communications (e.g. 902–928 MHz).

Each set-top terminal 100 connects to an associated television set 75. The digital signal processor 37 processes data packets for the selected program from the multiplexed stream to produce signals to drive the TV 75. The TV 75 presents the program to the viewer in sensorially perceptible form, in this case, as a standard audio/visual output.

Although not shown in FIG. 7, other data devices can connect to the coaxial cable in the home. For example, a PC and RF modem similar to 57, 55 in FIG. 4 can connect to the coaxial cable and conduct wireless packet data communications using the roof-top antenna 39.

Figure 8:
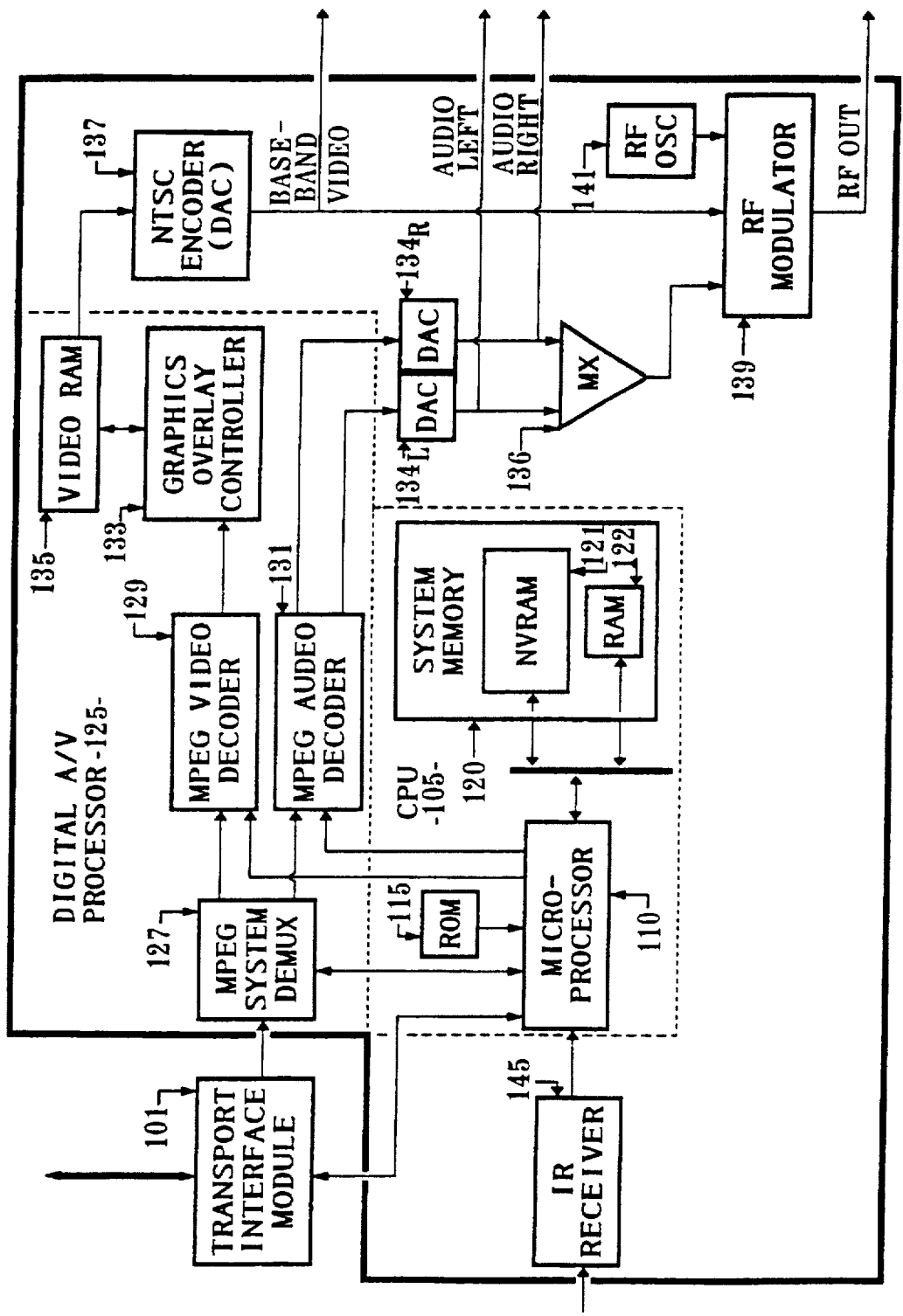
FIG. 8 illustrates in block diagram form the elements of one set-top terminal device used in the system of FIG. 7.

FIG. 8 illustrates the functional elements of the set-top terminal 100. In this embodiment the terminal 100 is a digital entertainment terminal, or 'DET.' The DET 100 will include a transport interface module (TIM) 101 providing the actual physical connection to the coaxial cable network in the subscriber's premises. The transport interface module (TIM) 101 will also perform the format conversion necessary between signal formats utilized by the network and signal formats used within the digital processing portion of the DET 100. In the present invention, the TIM performs RF tuning and QAM demodulation. If the programming is encrypted, the TIM also includes the necessary decryption circuitry. The TIM 101 also includes an RF wireless packet data modem for two-way signaling communications relating to interactive services, including the two-way signaling communications with the ISCP. The TIM 101 is the wireless signal processor 35. The main portion of the DET 100 serves as the digital signal processor 37.

In the illustrated embodiment, the transport interface module (TIM) 101 presents two connections to the rest of the DET, a high bit rate broadband connection for received broadband signals and a low bit rate signaling connection to permit control and monitoring of the TIM by a microprocessor 110 within the main portion of the DET and two-way communication of signaling data messages. For a selected channel, the TIM hands off the 27 Mbits/s baseband digital transport stream (payload only) captured from that RF channel to the main portion of the DET. The structure of the TIM 101 is described in more detail below with regard to FIG. 9.

The DET 100 includes a CPU 105, comprising a 386, 486 or Pentium microprocessor 110 and associated system memory 120. The system memory 120 may include volatile dynamic RAM 122 and non-volatile RAM 121. The microprocessor 110 includes a small amount of ROM 115 storing "loader" programming needed to control wake-up. An EPROM memory (not shown) also may be added.

A digital audio/video signal processor 125, controlled by the CPU 105, produces digital uncompressed audio and video signals from the audio and video MPEG encoded packets received from the network through the interface module 101. The audio/video processor 125 includes an MPEG system demultiplexer 127, an MPEG video decoder 129, an MPEG audio decoder 131, a graphics overlay controller 133 and at least two frames (e.g. 8 mbytes) of video RAM 135.

The MPEG system demultiplexer circuitry 127 recognizes packets in the MPEG data stream received over the broadband channel through the transport interface module (TIM) 101 and routes the packets having predetermined PID values to the appropriate components of the DET. For example, under CPU control, the MPEG system demultiplexer 127 circuitry recognizes audio and video packets in the MPEG data stream as audio and video relating to a selected program and routes those packets to the decoders 129, 131, respectively. The MPEG system demultiplexer circuitry 127 routes packets having specified PID values identified as user data packets to the CPU 105 for further processing. The MPEG system demultiplexer circuitry 127 recognizes program map packets and program association packets and supplies those packets to the CPU 105.

The MPEG video decoder 129 decompresses received video packet signals to produce a digital video signal, and the MPEG audio decoder 131 decompresses received audio packets to produce left and right digitized stereo signals. For at least some functions, the MPEG decoders 129, 131 may be controlled in response to signals from the microprocessor 110. The MPEG video decoder 129 will internally include at least two frames (e.g. 8 mbytes) of RAM (not separately shown) for use as a frame reorder buffer during the MPEG video decoding process, and the MPEG audio decoder 131 also may include some buffer memory.

The video RAM 135 is not a specialized "video RAM" as that term is sometimes used in the television art. The RAM 135 is actually a standard digital data RAM, of appropriate size, which is used in the DET to store digitized frames of video data. The RAM within the MPEG video decoder 129 likewise consists of standard digital data RAM.

The graphics display generator produces displays of text and graphics data, such as closed captioning received as user data in the MPEG stream or text or graphics information received in the signaling data messages, in response to instructions from the CPU 105. The video RAM 135 sequentially receives each frame of digitized, uncompressed video information, as output from the MPEG video decoder 129. The video RAM 135 also receives digital information and read/write control signals from the graphics overlay controller 133 representing the several planes of text and graphics information and combines that information with the frames of decompressed video to produce composite video frames.

The graphics overlay controller 133 and the video RAM 135 actually cooperate to manipulate five different planes of video information, four of which can be active at any one time, to produce the composite video frame output signals. The individual planes comprise the decoded MPEG video frames, a cursor, two graphics/text image planes manipulated by the microprocessor 110 and a backdrop plane. The backdrop plane would be switched in to replace the plane representing the decoded MPEG video frames, e.g. to present a blue background instead of the MPEG video background.

When there are no graphics or text, the composite frames would correspond entirely to the uncompressed received video frames output by the MPEG video decoder 129. When no received video frames are to be output, either when none are received or when they are to be entirely replaced, the information from the graphics overlay generator 133 would specify a background and the active planes of text or graphic information. When received video frames are combined with text and/or graphics, the composite video frames include the uncompressed received video frames with selected pixels thereof replaced with graphics or textual data display pixels specified by the graphics overlay controller 133. In this last situation, the graphics overlay controller would deactivate the backdrop plane.

The DET also includes audio and video digital to analog converters and appropriate drivers to produce output signals compatible with a conventional television set. Specifically, the converter and driver circuitry of the DET 100 includes audio digital to analog converters (DAC's) $135_L$, $135_R$, an audio mixer 136, an NTSC encoder 137, and an RF modulator 139.

The DAC's $135_L$ and $135_R$ receive the uncompressed left and right digitized audio signals output by the MPEG audio decoder 131. In response, the DAC's $135_L$ and $135_R$ produce baseband analog audio signals for output to individual baseband output terminals. The audio mixer 136 also receives the baseband audio signals from the DAC's $135_L$ and $135_R$. The mixer 136 combines the left and right analog audio signals to produce a monaural audio signal as the audio input to modulator 139.

The NTSC encoder 137 also performs a digital to analog converter (DAC) function. In response to the digitized video output signals from the video RAM 135, the NTSC encoder 137 produces a baseband analog video signal in standard NTSC format. The baseband NTSC video signal is supplied to an output terminal of the DET 100. The baseband NTSC video signal is also supplied to the RF modulator 139. The RF modulator 139 responds to the mono audio signal, the NTSC video signal and an RF signal from a local RF oscillator 141, to produce a standard RF television signal on an available TV channel, typically channel 3 or channel 4.

The type of connection of the DET 100 to the television set depends on the capabilities of the user's television set. If the user has a monitor type television capable of receiving baseband video and stereo audio inputs, the appropriate terminals of the television would connect directly to the video and audio output terminals of the DET 100. If the subscriber does not have such a television monitor, then the RF output of the modulator 139 would be connected to the cable or antenna input connection of the television, e.g. by coaxial cable. Alternatively, the digitized video and audio may go to separate output terminals (not shown) for connection to inputs of digital display devices, for example, for high definition television (HDTV) sets.

Each DET also includes means to receive selection signals from a user. The DET may include a built-in keyboard (not shown). In the embodiment illustrated in FIG. 1, the DET 100 includes an infrared (IR) receiver 145. The (IR) receiver 145 responds to inputs signals from a user operated IR remote control device 85 (shown in FIGS. 1, 4 and 7) similar to that used today for controlling televisions and video cassette recorders. In response to the IR signals, the receiver 145 produces corresponding digital data output signals. The microprocessor 110 interprets the digital data signals by the IR receiver 145 as input commands. For example, the microprocessor 110 will respond to an appropriate input command from the user to select a broadcast program. The microprocessor responds to other remote control inputs by transmitting appropriate upstream messages, for interactive video services and for telephone call processing related inputs.

Figure 9:
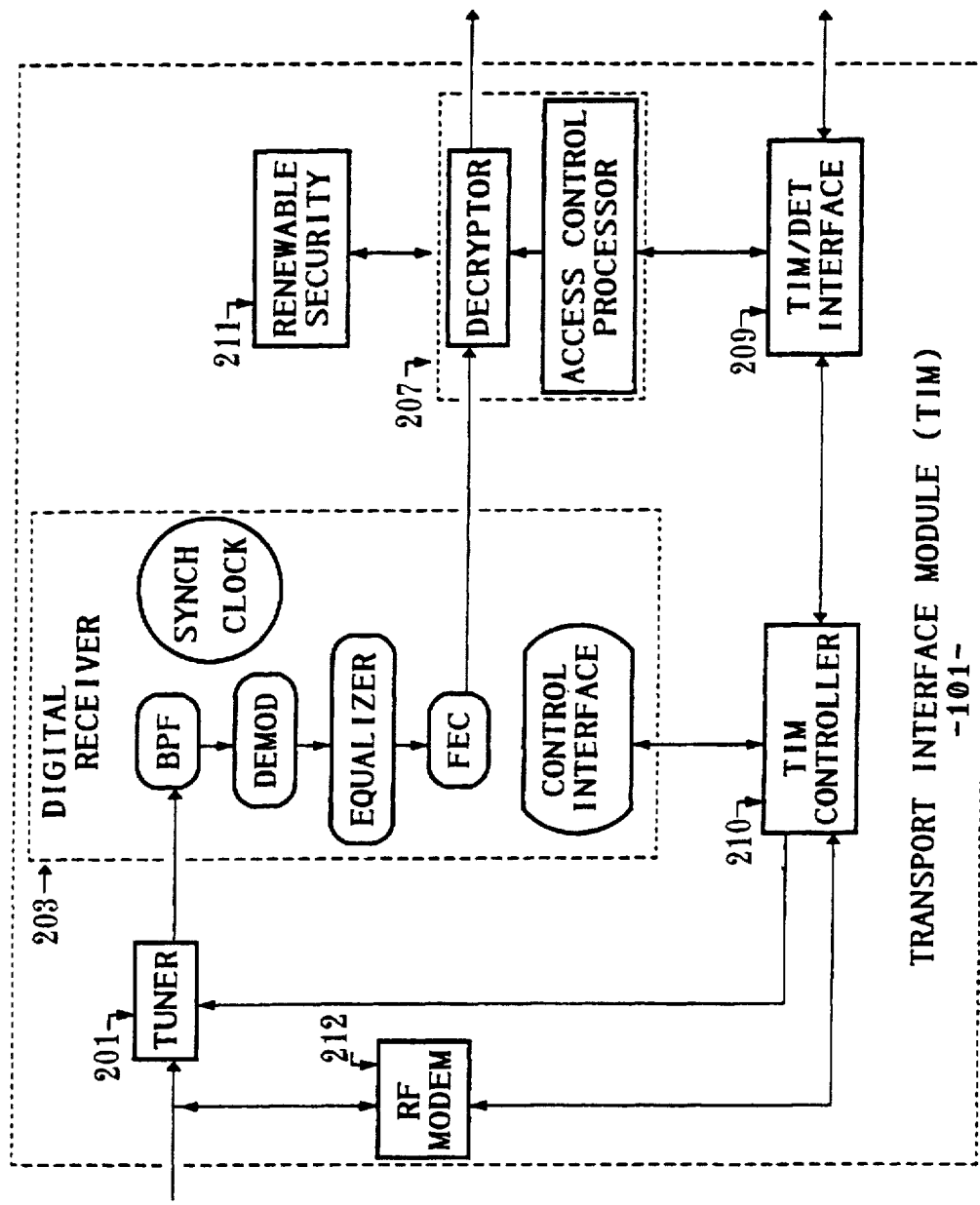
FIG. 9 is a block diagram illustration of the elements of a transport interface module used in the terminal of FIG. 8.

FIG. 9 depicts in block diagram form the structure of a TIM 101. The structure illustrated is based in part on the current preference for the 64 QAM modulation techniques for the digital video signals in a transmission system of the type shown in FIG. 6. The input to the TIM is a broadband RF signal in the 50–450 MHz range provided from a coaxial cable from the down converter 34 (see FIG. 7). The tuner 201 selects a specific 6 MHz channel from the broadband input spectrum and presents it at an intermediate frequency to the digital communications receiver section 203.

The digital receiver 203 includes a band-pass filter, a demodulator (e.g. 64 QAM), a time domain adaptive digital equalizer, and forward error correction circuitry. A clock circuit provides synchronization for the digital output of the demodulator, the adaptive digital equalizer, and the forward error correction circuitry.

The time domain adaptive digital equalizer receives the output of the QAM demodulator. Because of the multi-path delays and possibly offset arrival of the overlapping transmissions from multiple transmitter sites, the output of the demodulator will not be a clean digital pulse stream. Instead, the signal will be a composite of time delayed copies of the transmitted digital information. The time domain adaptive equalizer includes a multi-tap digital delay line, the length of which defines the time window of the delay equalizer. The outputs from the taps of the delay line may be weighted and summed, and the sum processed by a level detector or the like to recapture the original symbols (e.g. 1s and 0s of a digital stream). Examples of digital delay equalizers which may be used in the receivers of the present invention are described in Proakis, "Digital Communications," second edition, 1989, McGraw-Hill, Inc., chapter 6, although still other types of delay equalizers known to skilled technicians may be used. The forward error correction circuit processes the recaptured symbols (e.g. 1s and 0s) to determine if each is in the proper position in the stream.

A control interface provides appropriate control signals to the elements of the digital receiver 203 in response to instructions from the transport interface module (TIM) controller 210. The digital receiver processes signals selected from one of the RF channels by operation of the tuner 201 to capture one of the digital transport streams (e.g. only 27 Mbits/s payload assuming 64 QAM). The digital processor outputs the transport stream as a corrected serial baseband digital feed.

A decryption module 207 is optional. If included, this module controls access to digital broadcast services. The decryption module 207 comprises a decryptor and an interface to a renewable security device 211. The renewable security device 211 may be a card reader for accepting a TV Pass Card. An access control processor within the decryption module 207 controls the operation of the decryptor. The TIM controller 210 may also receive decryption information as signaling messages, via the packet data network and the RF modem 212. When properly authorized, the decryptor in module 207 decrypts payload data within packets of a selected program in the transport stream. The composite MPEG transport multiplex with appropriately decrypted components for the selected program is output from the TIM 101 to the host DET's demultiplexer 127 and decompression circuitry as shown in detail in FIG. 8. The TIM controller 210 and/or the decryption module 207 receive instructions from the CPU 105 (FIG. 8) as to channel and program selections via the TIM/DET interface 209.

The CPU 105 also sends and receives messages relating to interactive video services and certain telephone call processing services to the TIM controller 210 via the TIM/DET interface 209. The TIM 101 includes an RF modem 212, such as Ricochet modem offered for wireless packet data service in the 902–928 MHz range. The modem 212 interfaces to the TIM controller 210 via a standard data interface, such as an RS232 interface. The modem 212 also connects to the coaxial cable within the customer premises. The modem 212 sends and receives packet data messages in the relevant frequency range via the coaxial cable and the second antenna 39.

For example, if the user inputs a page selection using the remote control 85 during a catalog type interactive session, the infrared transceiver 145 supplies that input to the microprocessor 110. The microprocessor 110 recognizes the input as relating to an interactive service selection, formulates an appropriate message and forwards that message via the interface 209 to the TIM controller 210. The TIM controller 210 in turn forwards the message to the RF modem 212. The modem 212 packetizes the message as required for the particular wireless packet data network (e.g. in packets having a predetermined length and having particular addresses or identifiers). The modem modulates the packets using the assigned frequency and modulation techniques utilized on the particular wireless, data network. Assuming use of the Metricom type equipment, the modem utilizes a frequency hopping modulation technique in the 902–928 MHz range. The modem applies the modulated upstream signal to the in-home coaxial cable.

The coaxial cable carries the upstream modulated signal to the splitter/combiner 69 (FIG. 7). The splitter/combiner 69 and low pass filter 67 supply the modulated signal to the antenna 39 for wireless transmission to one of the pole top receivers 41.

In the reverse direction, a pole top receiver 41 broadcasts a packet message using the appropriate modulation technique and frequency. The packet includes an address temporarily or permanently assigned to the terminal 100. The antenna 39 receives the broadcast data signal and supplies that signal through the low pass filter 67 and the splitter/combiner 69 to the in-home coaxial cable. The RF modem 212 receives and processes the relevant portion of the frequency spectrum (e.g. 902–928 MHz) from the coaxial cable. The modem 212 demodulates the data transmission in that frequency range and recognizes packets bearing the address assigned to the terminal 100. The modem passes the messages from the addressed packets over the RS232 or other interface to the TIM controller 210. The TIM controller 210 may process the message, if appropriate, e.g. if the message relates to a decryption function. Alternatively, the TIM controller will pass the message through the TIM/DET interface 209 to the microprocessor 110 in the main portion of DET 100.

Messages transferred to the microprocessor 110 may relate to display information, typically text or graphics for overlay on video information displayed by the DET 100 on the associated television 75, e.g. relating to Caller ID information or destination digits on outgoing telephone calls. The messages may also relate to instructions to the DET, for example to capture and process packets having a predetermined PID in a particular manner to display a selected page of catalog information.

The above cited U.S. Pat. No. 08/491,515 application (attorney docket no. 680-130D) provides a more detailed description of the operation of the DET 100 for various video services, including broadcast service selection and operation of interactive services through a broadband channel, and that description is incorporated herein by reference.

While this invention has been described in connection with what is presently considered to be the preferred embodiment, it is to be understood that the invention is not limited to the disclosed embodiment, but, on the contrary, is intended to cover various modifications and equivalent arrangements included within the spirit and scope of the appended claims.

We claim:

1. A communication system comprising:

local telephone communication links;

a trunk circuit;

at least two separately located central office switching systems interconnected via the trunk circuit for selectively providing switched call connections between at least two of said local communication links;

a service control point, separate from the central office switching systems, comprising a database storing call processing data associated with a plurality of the local communication links for control of call processing through one or more of the central office switching systems;

an interoffice signaling network, coupled to the central office switching systems and the service control point, said interoffice signaling network providing signaling data communication links separate from the local communication lines and the trunk circuit; and a wireless network for distribution of broadband information and signaling information through a plurality of terminal devices, said wireless network comprising an interface point for communicating signaling data relating to a telephone call from the service control point through the wireless network to a selected one of the terminal devices.

2. A communication system as in claim 1, wherein:

the communication links are telephone links; and the central office switching systems are telephone switches.

3. A communication system as in claim 2, wherein a plurality of the telephone links are telephone lines.

4. A communication system as in claim 2, wherein the interoffice signaling network is adapted for transporting signaling system 7 (SS7) compliant signaling messages.

5. A communication system as in claim 1, wherein the wireless network comprises:

a headend generating a plurality of broadband program signals and a downstream signaling data signal; and at least one antenna radiating the broadband program signals and the downstream signaling data signal into a service area covering the plurality of terminal devices.

6. A communication system as in claim 5, wherein the interface point is an element of the headend.

7. A communication system as in claim 5, wherein the headend comprises:

a broadcast headend system generating a plurality of broadband program signals; and an interactive headend system generating a broadband signal containing interactive service information.

8. A communication system comprising:

local telephone communication links;

a trunk circuit;

at least two separately located central office switching systems interconnected via the trunk circuit for selectively providing switched call connections between at least two of said local communication links;

a service control point, separate from the central office switching systems, comprising a database storing call processing data associated with a plurality of the local communication links for control of call processing through one or more of the central office switching systems;

an interoffice signaling network, coupled to the central office switching systems and the service control point, said interoffice signaling network providing signaling data communication links separate from said local communication lines and the trunk circuit; and a wireless network for distribution of broadband information and signaling information through a plurality of terminal devices, said wireless network comprising an interface point for communicating signaling data relating to a telephone call from the service control point through the wireless network to a selected one of the terminal devices, and wherein said wireless network comprises:

a broadcast headend system for generating a plurality of broadband program signals and an interactive headend system for generating a broadband signal containing interactive service information; and at least one antenna for radiating the broadband program signals and downstream signaling data into a service area covering the plurality of terminal devices;

wherein the interface point is a gateway processor controlling at least some interactive operations of the interactive headend system.

9. A communication system as in claim 1, wherein the wireless network comprises:

a headend system producing a signal containing multiplexed channels, each channel carrying a transport stream comprising multiplexed streams of digitized broadband information;

at least one broadband wireless transmitter for broadcasting the signal containing multiplexed channels into a service area; and a wireless data network carrying said signaling information.

10. A communication system as in claim 9, wherein said at least one broadband wireless transmitter comprises a plurality of transmitters located at spaced apart sites transmitting said signal containing multiplexed channels so that areas of propagation from respective ones of the transmitters substantially overlap over each other in at least a major portion or the service area.

11. A communication system as in claim 9, wherein said wireless data network comprises a two-way wireless packet data network.

12. A communication system comprising:

local telephone communication links;

a trunk circuit;

at least two separately located central office switching systems interconnected via the trunk circuit for selectively providing switched call connections between at least two of said local communication links;

a service control point, separate from the central office switching systems, comprising a database storing call processing data associated with a plurality of the local communication links for control of call processing through one or more of the central office switching systems;

an interoffice signaling network, coupled to the central office switching systems and the service control point, said interoffice signaling network providing signaling data communication links separate from said local communication lines and the trunk circuit; and a two-way wireless packet data network for distribution of broadband information and signaling information through a plurality of terminal devices, said wireless network comprising an interface point for communicating signaling data relating to a telephone call from the service control point through the wireless network to a selected one of the terminal devices, wherein said two-way wireless packet data network comprises:

a headend system producing a signal containing multiplexed channels, each channel carrying a transport stream comprising multiplexed streams of digitized broadband information;

at least one broadband wireless transmitter for broadcasting the signal containing multiplexed channels in to a service area; and a wireless data network carrying said signaling information; and wherein the two-way wireless packet data network comprises a plurality of wireless transceivers for providing wireless data communications with modems in the terminal devices.

13. A communication system as in claim 12, wherein the two-way wireless packet data network further comprises at least one wireline access point in wireless communication with the plurality of wireless transceivers, said communication system further comprising a landline packet data network coupled to provide two-way packet data communication between the wireline access point and the interface point.

14. A communication system as in claim 13, wherein the landline packet data network comprises a frame relay network.

15. A communication system comprising:

local telephone communication links;

a trunk circuit;

at least two separately located central office switching systems interconnected via the trunk circuit for selectively providing switched call connections between at least two of said local communication links;

an interoffice signaling network coupled to the central office switching systems and providing signaling data communication links separate from the local communication lines and the trunk circuit;

a service control point, separate from the central office switching systems and coupled to the interoffice signaling network, said service control point comprising a database storing call processing data associated with a plurality of the local communication links for control of call processing through one or more of the central office switching systems; and a wireless network for distribution of broadband information through a plurality of terminal devices and transport of signaling information from the terminal devices representing at least certain user inputs, said wireless network comprising an interface point for communicating at least some of the signaling information to the service control point and for communicating signaling data relating to a telephone call between the service control point and, via the wireless network, to one of said terminal devices.

16. A communication system comprising:

local telephone communication links;

a trunk circuit;

at least two separately located central office switching systems interconnected via the trunk circuit for selectively providing switched call connections between at least two of said local communication links;

an interoffice signaling network coupled to the central office switching systems and providing signaling data communication links separate from the local communication lines and the trunk circuit;

a service control point, separate from the central office switching systems and coupled to the interoffice signaling network, said service control point comprising a database storing call processing data associated with a plurality of the local communication links for control of call processing through one or more of the central office switching systems; and a wireless network for distribution of broadband information through a plurality of terminal devices and two-way wireless signaling data communication with the terminal devices, said wireless network comprising an interface point for communicating signaling data relating to a telephone call from the service control point to a selected one of the terminal devices and at least some signaling information relating to a user input from the selected terminal device to the service control point.

17. A communication system comprising:

a headend system producing a signal containing multiplexed channels, each channel carrying a transport stream comprising multiplexed streams of digitized broadband information;

at least one broadband wireless transmitter for broadcasting the signal into a service area;

a two-way wireless packet data network;

a plurality of receiver systems within the service area, each receiver system comprising:

(i) an antenna for receiving a wireless transmission of the signal, (ii) an interface module processing the received signal to select one of the channels and acquire a transport stream from the selected channel, (iii) a digital signal processing section for processing digitized data from a selected stream of digitized broadband information contained in the acquired transport stream to present selected broadband information, and (iv) an RF modem for two-way communication of signaling messages to and from the receiver system via the wireless packet data network; and an interface providing two-way data communication between a service control point of an intelligent telephone network and the two-way wireless packet data network, to provide two-way communication of signaling messages between the service control point and a selected one of the receiver systems.

18. A communication system as in claim 17, wherein the interface module comprises:
   means for selectively receiving the selected channel; and
   means for demodulating a signal from the selected channel to acquire the transport stream from the selected channel,
   wherein the RF modem is an element of the interface module.

19. A communication system as in claim 17, wherein each receiver system further comprises:
   a control for supplying user input information to the receiver system, and
   a programmed central processing unit, wherein the programmed central processing unit controls selection by the interface module and the digital signal processing section in response to certain of the user input information and transmits messages through the RF modem in response to other user input information.

20. A communication system as in claim 19, wherein the RF modem receives messages via the two-way wireless packet data network and in response thereto supplies information to the programmed central processing unit.

21. A communication system as in claim 20, wherein in response to at least some information supplied by the RF modem, the programmed central processing unit causes the digital signal processing section to generate a display of said at least some information.

22. A communication system as in claim 17, wherein the headend system includes an interactive system comprising:
   a server outputting selected frames of video information;
   a packet data multiplexer for packetizing and multiplexing the selected frames of video information into the one transport stream; and
   a gateway processor responsive to signaling messages received via the wireless packet data network for controlling the server and the packet data multiplexer.

23. A communication system as in claim 22, wherein said gateway processor also serves as said interface.

24. A communication system as in claim 17, wherein said at least one broadband wireless transmitter comprises a plurality of transmitters located at spaced apart sites transmitting said signal containing multiplexed channels so that areas of propagation from respective ones of the transmitters substantially overlap over each other in at least a major portion or the service area.

25. A communication system as in claim 24, wherein the receiving antenna comprises a directional antenna.

26. A communication system as in claim 17, wherein each receiver system further comprises an antenna coupled to the RF modem for transmission and reception of signals between the RF modem and the two-way wireless packet data network.

27. A communication system as in claim 17, wherein the two-way wireless packet data network comprises a plurality of wireless transceivers for providing wireless communications with the RF modems.

28. A communication system as in claim 27, wherein the two-way wireless packet data network further comprises at least one wireline access point in wireless communication with the plurality of wireless transceivers, said communication system further comprising a landline packet data network coupled for two-way packet data communication with the wireline access point.

29. A communication system as in claim 28, wherein the landline packet data network comprises a frame relay network.

30. A method comprising:
   detecting an incoming telephone call for a predetermined subscriber premises through a central office of a telephone network;
   in response to detection of the incoming telephone call, sending a first message through an interoffice signaling system of the telephone network from the central office to a service control point, said first message including call related data;
   in response to the first message, transmitting a second message from the service control point through a signaling channel of a wireless broadband network, said second message being addressed to a terminal device for processing broadband information received through the wireless broadband network at the predetermined subscriber premises, said second message including information relating to the origin of the call; and
   presenting the information relating to the origin of the call from the second message on a broadband information output device driven by the terminal device.

31. A method as in claim 30, wherein the call related data includes a telephone number of a calling party, and the information relating to the origin of the call includes the telephone number of the calling party.

32. A method as in claim 30, wherein the information relating to the origin of the call includes a name.

33. A method as in claim 30, wherein the step of presenting the information relating to the origin of the call comprises overlaying the information relating to the origin of the call on broadband information processed and presented on the output device by the terminal device.

34. A method as in claim 30, further comprising:
   receiving input information from a user at the terminal device;
   transmitting a third message from the terminal device through a signaling channel through the wireless broadband network to the service control point, said third message containing a representation of the input information;
   transmitting a fourth message from the service control point to the central office, said fourth message including an instruction derived in response to the representation of the input information; and
   processing the incoming call in the central office based on the instruction.

35. A method as in claim 34, wherein the step of processing the incoming call comprises completing the call to the predetermined subscriber premises.

36. A method as in claim 34, wherein the step of processing the incoming call comprises completing the call to a destination corresponding to the input information.

37. A method comprising:
   detecting an outgoing telephone call from a predetermined subscriber premises through a central office of a telephone network;
   in response to detection of the outgoing telephone call, sending a first message through an interoffice signaling system of the telephone network from the central office to a service control point, said first message including information identifying a selected destination of the call;
   in response to the first message, transmitting a second message from the service control point through a signaling channel of a wireless broadband network, said second message being addressed to a terminal device for processing broadband information received through the wireless broadband network at the predetermined subscriber premises, said second message including information identifying the selected destination of the call;

presenting the information identifying the selected destination of the call on a broadband information output device driven by the terminal device;

receiving input information from a user at the a terminal device;

transmitting a third message from the terminal device through a signaling channel through the wireless broadband network to the service control point, said third message containing a representation of the input information;

transmitting a fourth message from the service control point to the central office, said fourth message including an instruction derived in response to the representation of the input information; and processing the outgoing call in the central office of the telephone network based on the instruction.

38. A method as in claim 37, wherein the information identifying a selected destination of the call includes a dialed telephone number.

39. A method as in claim 37, wherein the step of processing the call comprises completing the call to the selected destination.

40. A method as in claim 37, wherein the step of processing the call comprises completing the call to another destination corresponding to the input information.

* * * * *

UNITED STATES PATENT AND TRADEMARK OFFICE
CERTIFICATE OF CORRECTION

PATENT NO. : 5,751,707
DATED : May 12, 1998
INVENTOR(S) : Eric A. VOIT et al

It is certified that error appears in the above-indentified patent and that said Letters Patent is hereby corrected as shown below:

--[63] Continuation-in-part of Ser. No. 563,400, Nov. 30, 1995, and a continuation-in-part of Ser. No. 491,515, Jun. 19, 1995, Pat. No. 5,729,549.-- column 1, line 9, change "which is" to --and--.

Signed and Sealed this

Twenty-fifth Day of August, 1998

Attest:

BRUCE LEHMAN

*Attesting Officer*  *Commissioner of Patents and Trademarks*